(12) United States Patent
Wakabayashi et al.

(10) Patent No.: US 10,554,879 B2
(45) Date of Patent: Feb. 4, 2020

(54) IMAGING DEVICE, IMAGING DEVICE CONTROL METHOD, AND INTERCHANGEABLE LENS

(71) Applicant: FUJIFILM Corporation, Tokyo (JP)

(72) Inventors: Satoru Wakabayashi, Saitama (JP); Yuji Hasegawa, Saitama (JP); Shunta Ego, Saitama (JP); Atsushi Misawa, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/171,387

(22) Filed: Oct. 26, 2018

(65) Prior Publication Data

US 2019/0068875 A1    Feb. 28, 2019

Related U.S. Application Data

(63) Continuation of application No. PCT/JP2017/016040, filed on Apr. 21, 2017.

(30) Foreign Application Priority Data

Apr. 28, 2016   (JP) ................. 2016-090513

(51) Int. Cl.
  *H04N 5/232*   (2006.01)
  *G03B 17/18*   (2006.01)
  *G03B 17/14*   (2006.01)

(52) U.S. Cl.
  CPC ......... *H04N 5/23222* (2013.01); *G03B 17/14* (2013.01); *G03B 17/18* (2013.01);
  (Continued)

(58) Field of Classification Search
  CPC ................ H04N 5/23222; H04N 5/23209
  See application file for complete search history.

(56) References Cited

U.S. PATENT DOCUMENTS

2012/0105588 A1   5/2012 Yamamoto
2013/0242134 A1*  9/2013 Komiyama .......... H04N 9/8205
                                            348/231.5

FOREIGN PATENT DOCUMENTS

JP    2004247983    9/2004
JP    2005201995    7/2005
(Continued)

OTHER PUBLICATIONS

"International Search Report (Form PCT/ISA/210) of PCT/JP2017/016040," dated Jun. 27, 2017, with English translation thereof, pp. 1-5.

(Continued)

*Primary Examiner* — Christopher K Peterson
(74) *Attorney, Agent, or Firm* — JCIPRNET

(57) ABSTRACT

A camera main body includes a mount, a solid-state imaging element, a main body controller, a main body side storage section, and a rear surface display section. In the mount, a plurality of types of interchangeable lenses are selectively mounted. The main body controller acquires a lens type of each interchangeable lens mounted on the mount, counts the number of mounting operations and the number of imaging operations for each lens type of the interchangeable lens, and stores the result in the main body side storage section. In a case where the interchangeable lens is mounted on the mount, the main body controller changes a setting menu to be displayed on the rear surface display section in accordance with the lens type acquired from the interchangeable lens, and the number of mounting operations and the number of imaging operations corresponding to the lens type.

36 Claims, 21 Drawing Sheets

(52) U.S. Cl.
CPC ......... *H04N 5/232* (2013.01); *H04N 5/23209* (2013.01); *H04N 5/23216* (2013.01); *H04N 5/23296* (2013.01)

(56) References Cited

FOREIGN PATENT DOCUMENTS

| | | |
|---|---|---|
| JP | 2010181725 | 8/2010 |
| JP | 2010252074 | 11/2010 |
| JP | 2012095167 | 5/2012 |
| JP | 2012123157 | 6/2012 |
| JP | 2016021684 | 2/2016 |

OTHER PUBLICATIONS

"Written Opinion of the International Searching Authority (Form PCT/ISA/237) of PCT/JP2017/016040," dated Jun. 27, 2017, with English translation thereof, pp. 1-7.

* cited by examiner

M1 → BASIC MENU

| IMAGE QUALITY MODE | FINE |
|---|---|
| FACE DETECTION/ PUPIL AF SETTING | FACE DETECTION ON/ PUPIL AF AUTO |
| SELF-TIMER | OFF |
| SHUTTER TYPE | ES+MS |
| SENSITIVITY AUTO SETTING | AUTO3 |
| FLASH MODE | AUTO |
| MOTION PICTURE MODE | FULLHD 60fps |

| IMAGE QUALITY MOD | FINE |
|---|---|
| | NORMAL |
| | FINE+RAW |
| | NORMAL+RAW |
| | RAW |

FIG. 7

| FACE DETECTION/ PUPIL AF SETTING | FACE DETECTION ON/ PUPIL AF OFF |
| --- | --- |
| | FACE DETECTION ON/ PUPIL AF ON |
| | FACE DETECTION OFF/ PUPIL AF OFF |

FIG. 8

| SELF-TIMER | OFF |
| --- | --- |
| | 2S |
| | 10S |

FIG. 9

| SHUTTER TYPE | MS |
| --- | --- |
| | ES |
| | MS+ES |

FIG. 10

| SENSITIVITY AUTO SETTING | AUTO1 | 800 |
| --- | --- | --- |
| | AUTO2 | 1600 |
| | AUTO3 | 3200 |

FIG. 11

| FLASH MODE | AUTO |
| --- | --- |
| | FLASH ON |
| | SLOW SYNCHRONIZATION |
| | SECOND-CURTAIN SYNCHRONIZATION |
| | FLASH OFF |

FIG. 12

| MOTION PICTURE MODE | FULLHD 60fps |
| --- | --- |
| | FULLHD 30fps |
| | HD 60fps |
| | HD 30fps |

| DETAILED MENU | 1/10 |
|---|---|
| IMAGE SIZE | 6000 × 4000 |
| IMAGE QUALITY MODE | FINE |
| RECORDING TYPE | NON-COMPRESSION |
| FILM SIMULATION | STD |
| DYNAMIC RANGE | 100 |
| WHITE BALANCE | AUTO |
| HIGHLIGHT TONE | 0 |
| ⋮ | ⋮ |

IMAGING DEVICE, IMAGING DEVICE CONTROL METHOD, AND INTERCHANGEABLE LENS

CROSS-REFERENCE TO RELATED APPLICATIONS

This application is a Continuation of PCT International Application No. PCT/JP2017/016040 filed on 21 Apr. 2017, which claims priority under 35 U.S.C § 119(a) to Japanese Patent Application No. 2016-090513 filed on 28 Apr. 2016. The above application is hereby expressly incorporated by reference, in its entirety, into the present application.

BACKGROUND OF THE INVENTION

1. Field of the Invention

The present invention relates to an imaging device in which a plurality of types of interchangeable lenses are selectively mounted, an imaging device control method, and an interchangeable lens.

2. Description of the Related Art

In an imaging device such as a digital camera, there is a device that has a variety of imaging functions in order to capture a high-quality image. As such an imaging device, generally, a device capable of displaying setting menus on a display panel and setting imaging functions on the basis of the setting menus is used.

On the other hand, an interchangeable lens type digital camera in which a plurality of types of interchangeable lenses are selectively mounted on a camera main body is known. JP2004-247983A and JP2012-095167A (corresponding to US2012/0105588A1) disclose digital cameras capable of, in a case where an interchangeable lens is mounted on a camera main body, accessing storage means provided in the interchangeable lens and automatically acquiring specific information of the interchangeable lens. In the digital cameras, setting menus are changed in accordance with the specific information of the interchangeable lens.

SUMMARY OF THE INVENTION

In an imaging device for an advanced level person such as an interchangeable lens type digital camera, in accordance with an increase in imaging functions, setting items in setting menus also tend to be increased. Accordingly, it is difficult to find out setting items for setting imaging functions that a user wants to use.

In the digital cameras disclosed in JP2004-247983A and JP2012-095167A, since the setting menus are changed in accordance with the specific information of the interchangeable lens, there is a case where setting items for setting imaging functions that a user wants to use are not displayed. Particularly, in a case where an interchangeable lens different from an interchangeable lens that the user normally uses is mounted, the setting menus are also changed to setting menus different from setting menus that are normally used, and thus, usability becomes poor.

An object of the invention is to provide an imaging device and an imaging device control method capable of appropriately changing display content of setting menus in accordance with a usage situation of a user, and an interchangeable lens therefor.

According to an aspect of the invention, there is provided an imaging device comprising a lens mounting section, an imaging section, a lens type detection section, a controller, a menu display section, a lens type, and a setting menu change section. On the lens mounting section, a plurality of types of interchangeable lenses are selectively mounted. The imaging section performs imaging in a state where the interchangeable lens is mounted on the lens mounting section. The lens type detection section detects a lens type of the interchangeable lens mounted on the lens mounting section. The controller counts the number of mounting operations of the interchangeable lens on the lens mounting section and the number of imaging operations of the imaging section, for each lens type of the interchangeable lens detected by the lens type detection section, and stores the result in a storage section provided in a device main body or the interchangeable lens. The menu display section displays a setting menu for setting an imaging function of the imaging section. The setting menu change section changes, in a case where the interchangeable lens is mounted on the lens mounting section, the setting menu in accordance with the lens type detected by the lens type detection section and the number of mounting operations, and the number of imaging operations corresponding to the lens type detected by the lens type detection section among the number of mounting operations and the number of imaging operations stored in the storage section.

It is preferable that the menu display section displays a plurality of display setting items selected from a plurality of setting items, as the setting menu. It is preferable that the setting menu change section changes the display setting items to be displayed as the setting menu, in accordance with the lens type and the number of mounting operations.

It is preferable that the setting menu change section changes an order of the display setting items to be displayed as the setting menu, in accordance with the lens type and the number of mounting operations. It is preferable that the setting menu change section changes the number of the display setting items to be displayed as the setting menu, in accordance with the lens type and the number of mounting operations. It is preferable that the setting menu change section uses the number of mounting operations weighted on the basis of a weight value proportional to the number of imaging operations.

It is preferable that the setting menu change section changes the display setting items to be displayed as the setting menu, in accordance with the lens type and the number of imaging operations. It is preferable that the setting menu change section changes an order of the display setting items to be displayed as the setting menu, in accordance with the lens type and the number of imaging operations.

It is preferable that the setting menu change section changes the number of the display setting items to be displayed as the setting menu, in accordance with the lens type and the number of imaging operations. It is preferable that the setting menu change section uses the number of imaging operations weighted on the basis of a weight value proportional to the number of mounting operations.

It is preferable that the controller counts an accumulated mounting time when the interchangeable lens is mounted on the lens mounting section for each lens type of the interchangeable lens detected by the lens type detection section, and stores the result in the storage section and the setting menu change section changes the setting menu in accordance with the accumulated mounting time in addition to the number of mounting operations and the number of imaging operations.

It is preferable that the setting menu change section changes display setting items to be displayed as the setting menu, in accordance with the lens type and the accumulated mounting time. It is preferable that the setting menu change section changes an order of display setting items to be displayed as the setting menu, in accordance with the lens type and the accumulated mounting time.

It is preferable that the setting menu change section changes the number of display setting items to be displayed as the setting menu, in accordance with the lens type and the accumulated mounting time. It is preferable that the setting menu change section uses the accumulated mounting time weighted using a weight value proportional to any one of the number of mounting operations or the number of imaging operations.

It is preferable that in a case where the lens type detected by the lens type detection section is a specific lens type and at least one of the number of mounting operations, the accumulated mounting time, or the number of imaging operations corresponding to the specific lens type is equal to or greater than a setting value, the setting menu change section changes the setting menu.

It is preferable that in a case where the lens type detected by the lens type detection section is a specific lens type and a total sum of at least one of the numbers of mounting operations, the accumulated mounting times, or the numbers of imaging operations corresponding to a plurality of types of the interchangeable lenses that are the specific lens types is equal to or greater than a setting value, the setting menu change section changes the setting menu.

It is preferable that in a case where total sums of any two or more of the numbers of mounting operations, the accumulated mounting times, or the numbers of imaging operations corresponding to the plurality of types of interchangeable lenses that are the specific lens types are equal to or greater than the setting values, the setting menu change section resets the setting menu to an initial value, and in a case where the setting menu is reset to the initial value by the setting menu change section, the controller resets the number of counting operations stored in the storage section to an initial value.

It is preferable that that imaging device further comprises: a history storage section different from the storage section provided in the device main body or the interchangeable lens, in which in a case where the setting menu is reset to the initial value by the setting menu change section, the controller resets the number of counting operations stored in the storage section to the initial value, and stores the number of mounting operations, the accumulated mounting time, and the number of imaging operations of the imaging section before resetting stored for each lens type in the history storage section.

It is preferable that the imaging device further comprises: a position information acquisition section that acquires position information; and a time point acquisition section that acquires a mounting time point when the interchangeable lens is mounted on the lens mounting section, a mounting release time point when the interchangeable lens is detached from the lens mounting section, and an imaging time point of the imaging section, in which the controller stores the position information acquired by the position information acquisition section at the mounting time point, the mounting release time point, and the imaging time point in the storage section, in association with the mounting time point, the mounting release time point, and the imaging time point, for each lens type of the interchangeable lens.

It is preferable that in a case where the lens type detected by the lens type detection section is a specific lens type and at least one of current position information acquired by the position information acquisition section or a current time point matches position information and an imaging time point stored in the storage section, the controller reads out the mounting time point and the mounting release time point in association with the position information and the imaging time point in correspondence with the specific lens type, and calculates an accumulated mounting time when the interchangeable lens is mounted on the lens mounting section, and in a case where at least one of the number of mounting operations, the accumulated mounting time, or the number of imaging operations is equal to or greater than a setting value, the setting menu change section changes the setting menu.

It is preferable that in a case where at least one of current position information acquired by the position information acquisition section or a current time point matches position information and an imaging time point stored in the storage section, in correspondence with a plurality of types of the interchangeable lenses of which the lens type detected by the lens type detection section is a specific lens type, the controller reads out the mounting time point and the mounting release time point associated with the position information and the imaging time point, and calculates an accumulated mounting time when each interchangeable lens is mounted on the lens mounting section, and in a case where at least one of the number of mounting operations, the accumulated mounting time, or the number of imaging operations is equal to or greater than a setting value, the setting menu change section changes the setting menu.

It is preferable that in a case where at least two of the number of mounting operations, the accumulated mounting time, or the number of imaging operations are equal to or greater than the setting values, the setting menu change section resets the setting menu to an initial value, and in a case where the setting menu is reset to the initial value by the setting menu change section, the controller resets the number of counting operations stored in the storage section to an initial value.

It is preferable that the imaging device further comprises: a history storage section different from the storage section provided in the device main body or the interchangeable lens, in which in a case where the setting menu is reset to the initial value by the setting menu change section, the controller resets the number of counting operations stored in the storage section to the initial value, and stores the number of mounting operations, the accumulated mounting time, and the number of imaging operations before resetting stored for each lens type in the history storage section.

It is preferable that in a case where all of the number of mounting operations, the accumulated mounting time, and the number of imaging operations in a case where at least one of the current position information acquired by the position information acquisition section or the current time point matches the position information and the imaging time point stored in the storage section are smaller than the setting values, in correspondence with a plurality of types of the interchangeable lenses of which the lens type detected by the lens type detection section is a specific lens type, the setting menu change section changes the setting menu in accordance with the number of mounting operations, the accumulated mounting time, and the number of imaging operations before resetting stored in the history storage section.

It is preferable that the setting menu change section sets a zoom lens in which a focus of an imaging optical system is variable by movement of a variable magnification lens as the specific lens type. It is preferable that in a case where the lens type detected by the lens type detection section is the zoom lens and at least one of the number of mounting operations, the accumulated mounting time, or the number of imaging operations corresponding to the zoom lens is equal to or greater than a setting value, the setting menu change section sets the number of display setting items to be displayed as the setting menu to be smaller than an initial value.

It is preferable that in a case where the number of the display setting items to be displayed as the setting menu is set to be smaller than the initial value, the setting menu change section deletes at least one display setting item among a focus setting item, a flash setting item, and a motion picture setting item.

It is preferable that the setting menu change section sets a fixed focus lens in which a focus of an imaging optical system is fixed as the specific lens type. It is preferable that in a case where the lens type detected by the lens type detection section is the fixed focus lens and a total sum of the numbers of imaging operations corresponding to a plurality of types of the interchangeable lenses that are the fixed focus lenses is equal to or greater than a predetermined number, the setting menu change section sets the number of display setting items to be displayed as the setting menu to be larger than an initial value.

It is preferable that the setting menu change section sets a wide angle lens as the specific lens type. It is preferable that the setting menu change section displays, in a case where the lens type detected by the lens type detection section is the wide angle lens and a total sum of at least one of the numbers of mounting operations, the accumulated mounting times, or the numbers of imaging operations corresponding to a plurality of types of the interchangeable lenses that are the wide angle lenses is equal to or greater than a setting value, display setting items suitable for scenery imaging as the setting menu.

It is preferable that the setting menu change section sets a large diameter lens as the specific lens type. It is preferable that in a case where the lens type detected by the lens type detection section is the large diameter lens and a total sum of at least one of the numbers of mounting operations, the accumulated mounting times, or the numbers of imaging operations corresponding to a plurality of types of the interchangeable lenses that are the large diameter lenses is equal to or larger than a setting value, the setting menu change section displays display setting items suitable for night scene imaging or portrait imaging as the setting menu.

According to another aspect of the invention, there is provided an interchangeable lens which is mounted on the lens mounting section of the imaging device and is provided with the storage section.

According to still another aspect of the invention, there is provided an imaging device control method comprising: a step of detecting a lens type of an interchangeable lens mounted on a lens mounting section; a step of counting the number of mounting operations of the interchangeable lens on the lens mounting section and the number of imaging operations performed in a state where the interchangeable lens is mounted on the lens mounting section, for each lens type of the interchangeable lens; a step of storing the number of mounting operations and the number of imaging operations; a step of displaying a setting menu for setting an imaging function; and a step of changing, in a case where the interchangeable lens is mounted on the lens mounting section, the setting menu in accordance with the lens type, and the number of mounting operations and the number of imaging operations corresponding to the lens type.

According to the invention, it is possible to appropriately change display contents of a setting menu in accordance with a usage situation of a user.

BRIEF DESCRIPTION OF THE DRAWINGS

FIG. 7 is a diagram illustrating a display screen showing a selection candidate list in a case where a display setting item of a face detection/pupil AF setting is selected from the setting menu.

FIG. 8 is a diagram illustrating a display screen showing a selection candidate list in a case where a display setting item of a self-timer is selected from the setting menu.

FIG. 9 is a diagram illustrating a display screen showing a selection candidate list in a case where a display setting item of a shutter type is selected from the setting menu.

FIG. 10 is a diagram illustrating a display screen showing a selection candidate list in a case where a display setting item of a sensitivity AUTO setting is selected from the setting menu.

FIG. 11 is a diagram illustrating a display screen showing a selection candidate list in a case where a display setting item of a flash mode is selected from the setting menu.

FIG. 12 is a diagram illustrating a display screen showing a selection candidate list in a case where a display setting item of a motion picture mode is selected from the setting menu.

DESCRIPTION OF THE PREFERRED EMBODIMENTS

First Embodiment

Figure 1:
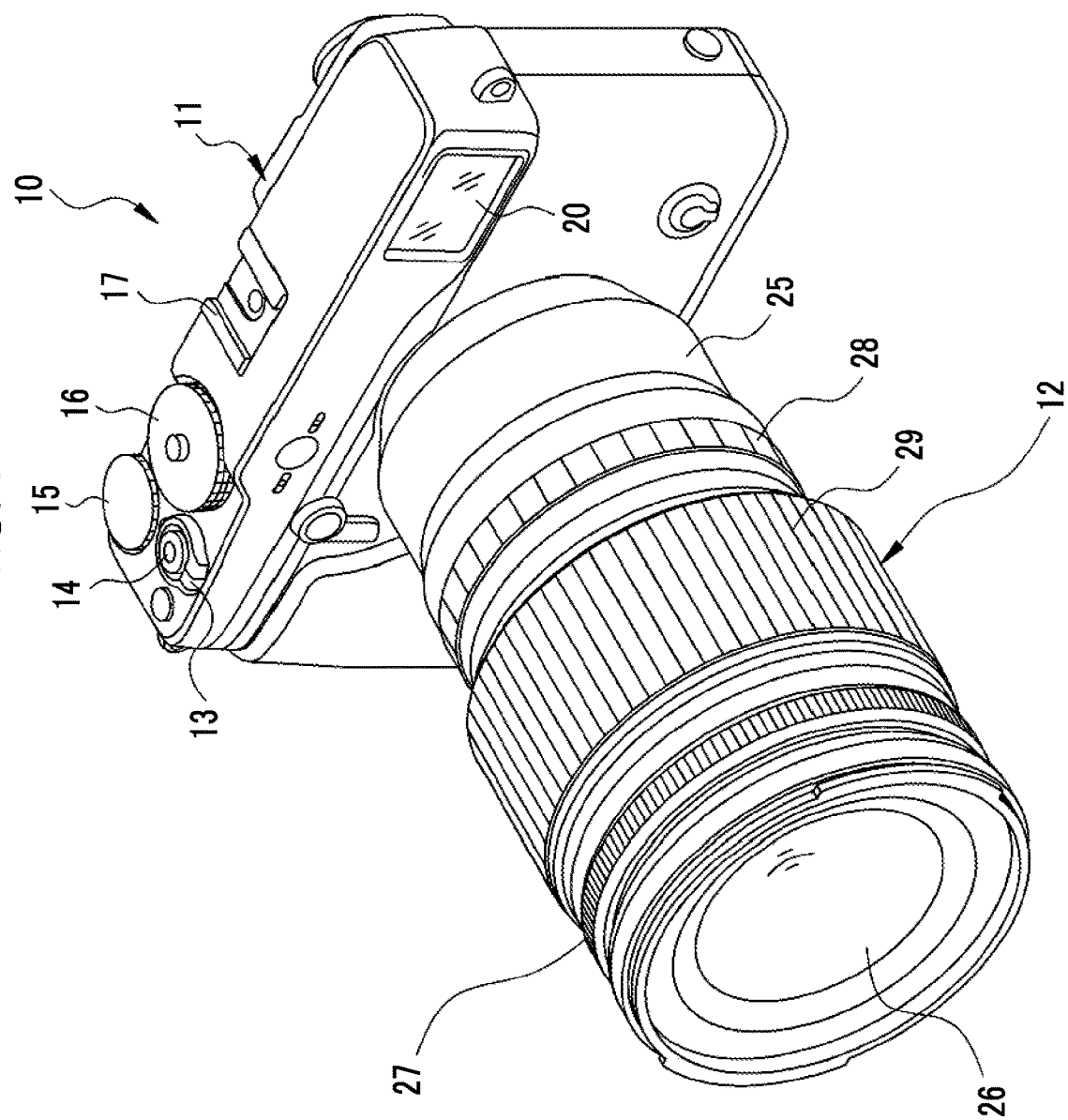
FIG. 1 is a perspective view showing a front side appearance of an interchangeable lens type digital camera.
Figure 2:
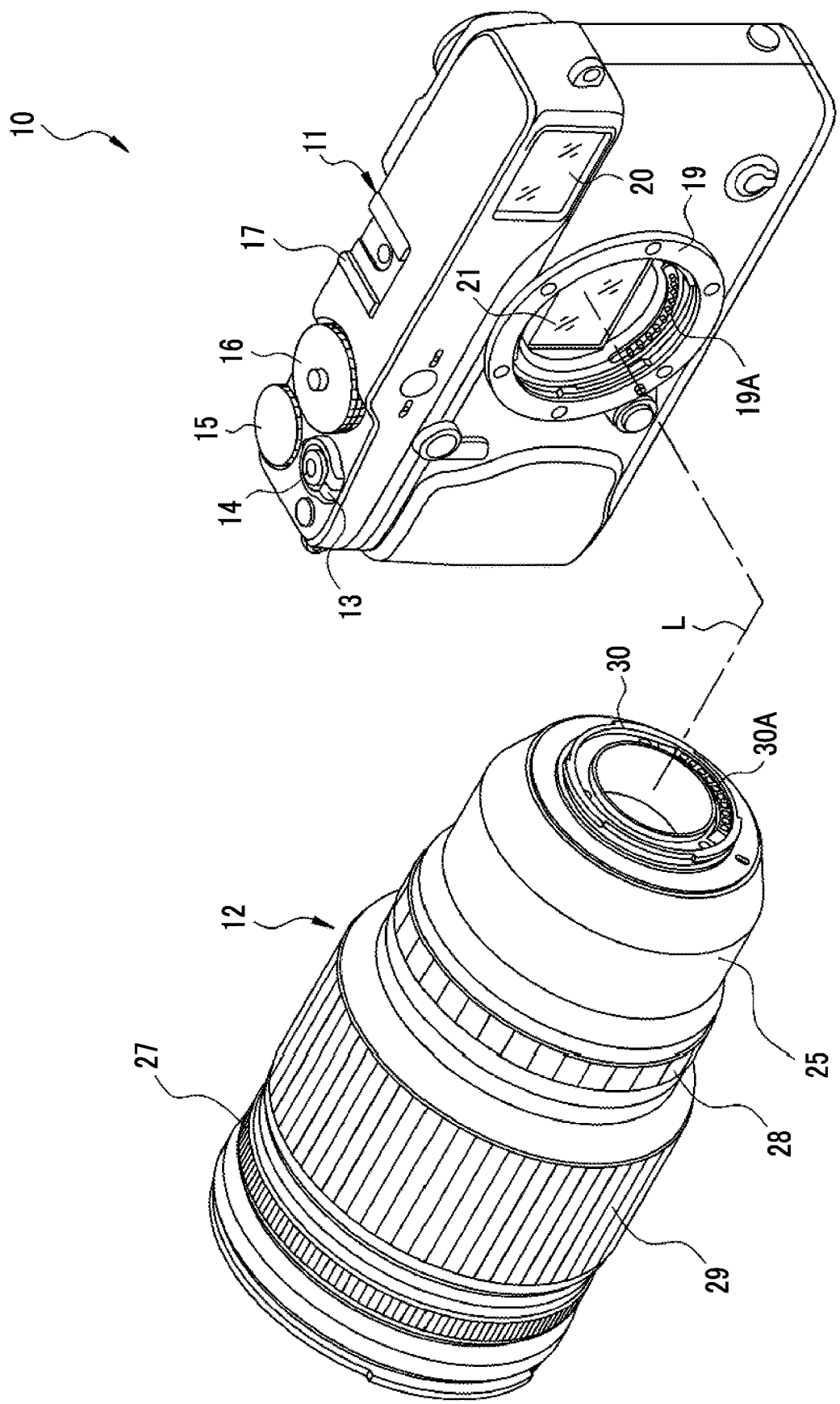
FIG. 2 is a perspective view showing an appearance of an interchangeable lens and a camera main body.

Referring to FIGS. 1 and 2, an interchangeable lens type digital camera (hereinafter, referred to as a camera) 10 includes a camera main body 11 and an interchangeable lens 12. The camera 10 is a so-called mirrorless single-lens type digital camera. As the interchangeable lens 12, as described later, a plurality of types of lenses such as a standard lens, a wide angle lens, or a telephoto lens are used.

The camera main body 11 includes a power source lever 13 on an upper surface thereof, a release switch 14, an exposure correction dial 15, a shutter speed/ISO sensitivity dial 16, a hot shoe 17, and the like. The release switch 14 is a two-stage stroke switch capable of performing so-called "half-push" and "full-push". The release switch 14 outputs an S1 ON signal by being half pushed, and outputs an S2 ON signal by being fully pushed from the half-push. The camera 10 executes an imaging preparation process such as an auto focus adjustment (AF process) or an auto exposure control in a case where the S1 ON signal is output from the release switch 14, and executes an imaging process in a case where the S2 ON signal is output.

Figure 3:
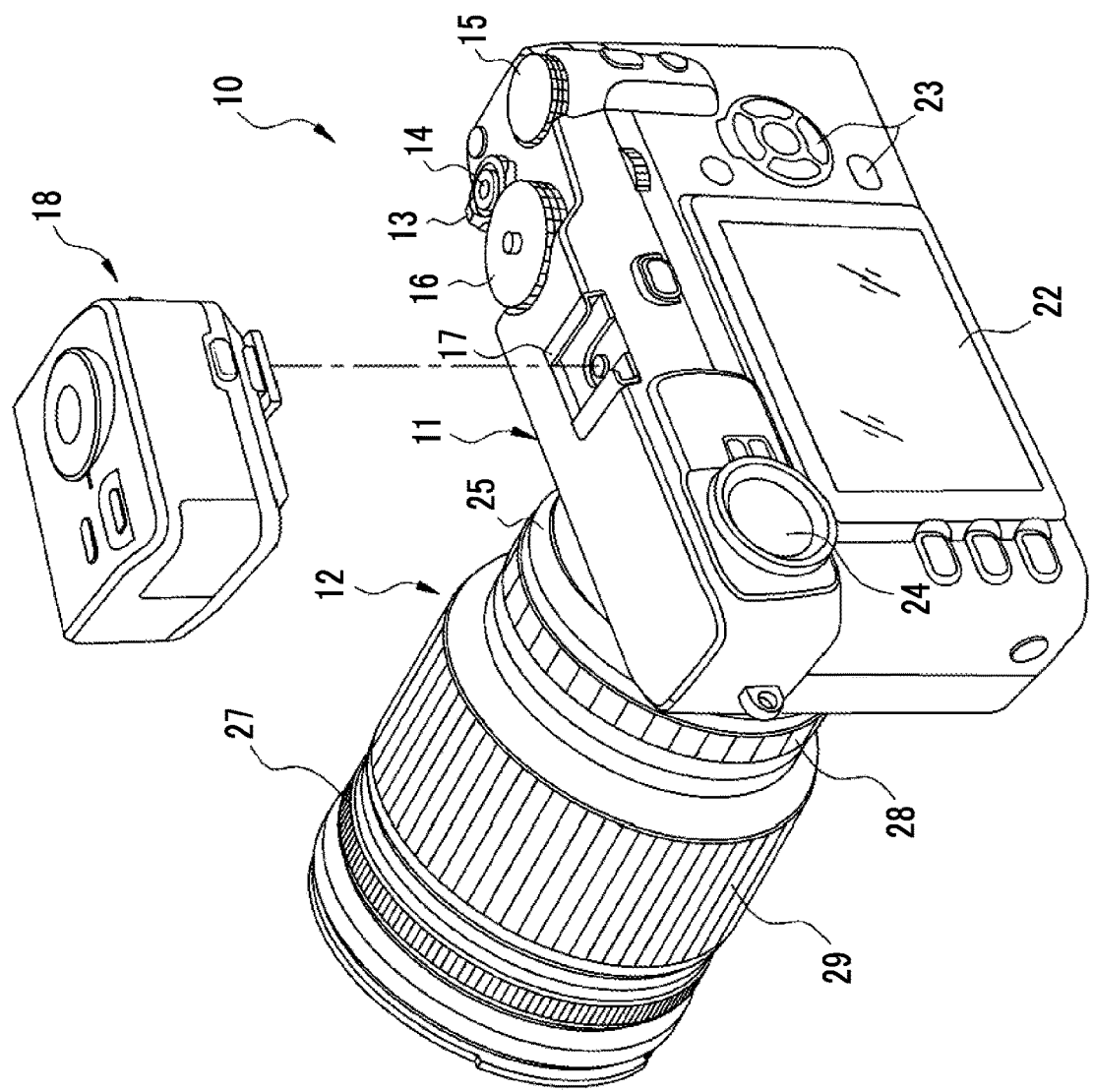
FIG. 3 is a perspective view showing a rear side appearance of the interchangeable lens type digital camera.

The hot shoe 17 is a mounting portion for mounting of an external flash device 18 (see FIG. 3). By mounting the external flash device 18 in the hot shoe 17, the camera 10 and the external flash device 18 are electrically connected to each other.

On a front surface of the camera main body 11, a mount 19 and an optical finder window 20 are provided. The mount 19 corresponds to a lens mounting section of the invention, on which a plurality of types of interchangeable lenses 12 are selectively mounted. Inside the mount 19 to which the interchangeable lenses 12 are attached, a body side signal contact 19A for being electrically connected to the interchangeable lens 12 and a solid-state imaging element 21 are provided.

As shown in FIG. 3, on a rear surface of the camera main body 11, a rear surface display section 22, a plurality of operating buttons 23, a finder eyepiece section 24, and the like are provided. The rear surface display section 22 is a menu display section used for display of a live view image, reproduction of a captured image, display of a setting menu, or the like. The plurality of operating buttons 23 are used for various setting operations, or the like. The rear surface display section 22 is formed of an LCD panel, for example. The finder eyepiece section 24 is switchable between an optical finder that uses an image passed through the optical finder window 20 and an electronic finder that uses an image captured by the solid-state imaging element 21. In a case where the finder eyepiece section 24 is switched to the electronic finder, a live view image captured by the solid-state imaging element 21 is displayed on an electronic view finder (EVF) panel 59 (see FIG. 4) that is disposed in the back of the finder eyepiece section 24 and is formed of the LCD.

As shown in FIG. 2, the interchangeable lens 12 includes a lens barrel 25, an imaging optical system 26, a focus ring 27, a stop operating ring 28, a zoom ring 29, a lens mount 30, and the like. The lens barrel 25 has a cylindrical shape, accommodates the imaging optical system 26 therein, and is provided with the lens mount 30 at a rear end thereof. The imaging optical system 26 forms an image of subject light in the solid-state imaging element 21 in a case where the interchangeable lens 12 is mounted on the camera main body 11. The solid-state imaging element 21 is an imaging section that performs imaging on the basis of light emitted from the interchangeable lens 12.

The lens mount 30 is detachably coupled with the mount 19 of the camera main body 11. On the lens mount 30, a lens side signal contact 30A is provided. The lens side signal contact 30A is in contact with the body side signal contact 19A in a case where the lens mount 30 of the interchangeable lens 12 is coupled with the mount of the camera main body 11, so that the interchangeable lens 12 and the camera main body 11 are electrically connected to each other.

Figure 4:
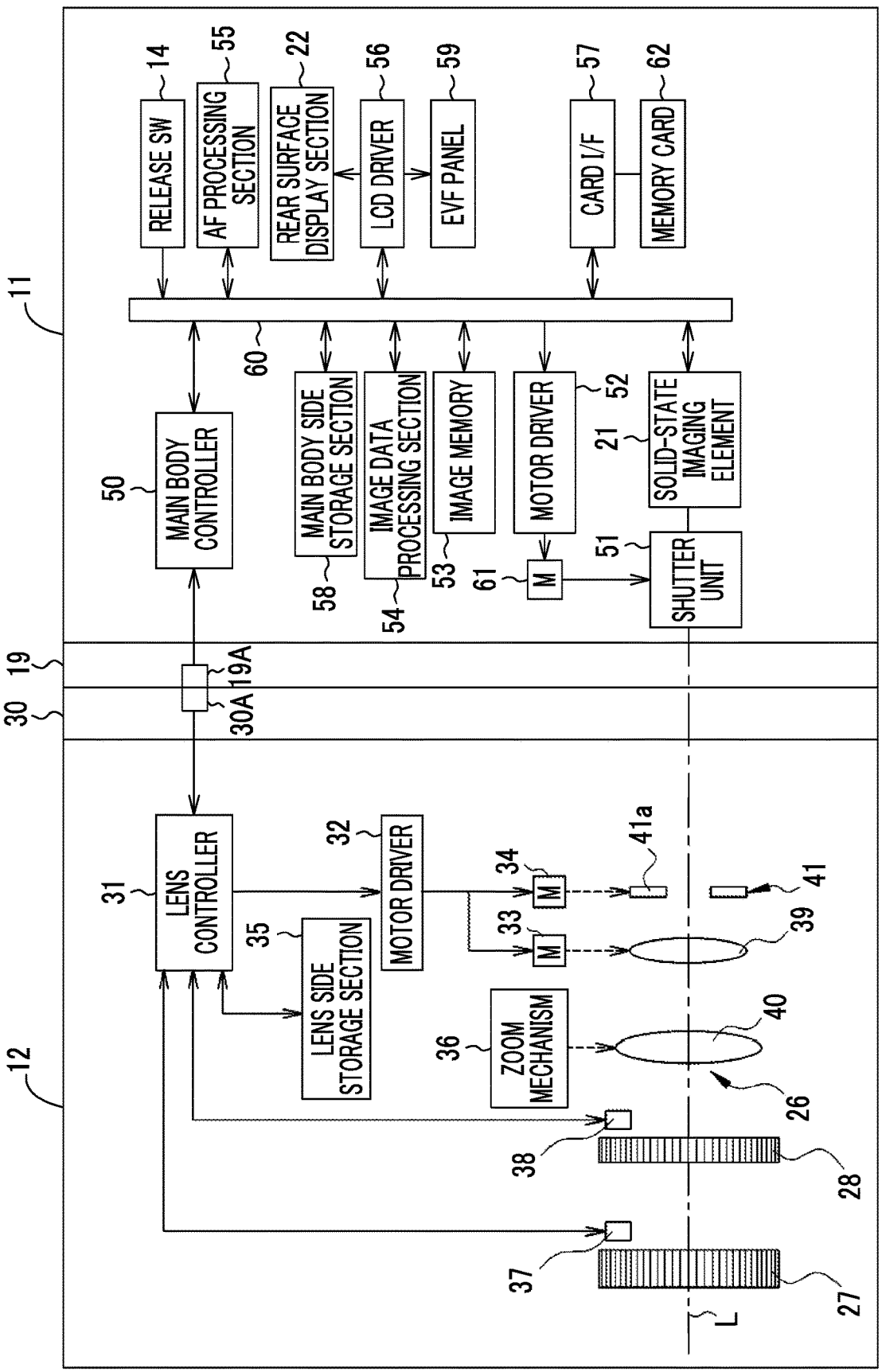
FIG. 4 is a block diagram showing a configuration of the interchangeable lens type digital camera.

As shown in FIG. 4, the interchangeable lens 12 includes a lens controller 31, a motor driver 32, motors 33 and 34, a lens side storage section 35, a zoom mechanism 36, sensors 37 and 38, and the like, in addition to the imaging optical system 26, the focus ring 27, and the stop operating ring 28. The lens side storage section 35 is formed of a non-volatile memory such as an electrically erasable programmable read-only memory (EEPROM), for example. In the lens side storage section 35, a lens type and identification data (ID) of the interchangeable lens 12 are stored. In addition, the invention is not limited thereto, and lens type information may be included in the lens ID.

The lens controller 31 is configured of a micro-computer that includes a central processing unit (CPU), a read only memory (ROM) that stores a program and parameters used in the CPU, a random access memory (RAM) used as a work memory of the CPU (not shown), and the like, and controls respective units of the interchangeable lens 12. The motor driver 32, the lens side storage section 35, and the sensors 37 and 38 are connected to the lens controller 31.

The imaging optical system 26 includes a plurality of lenses including a focus lens 39, a variable magnification lens 40, a stop unit 41, and the like. The focus lens 39 is moved in a direction of an optical axis L by driving of the motor 33 to adjust an imaging distance. The stop unit 41 moves a plurality of stop leaf blades 41a by driving of the motor 34 to change the intensity of light incident onto the solid-state imaging element 21. The motor driver 32 controls the driving of the motors 33 and 34 under the control of the lens controller 31.

The zoom mechanism 36 is a manual zoom mechanism that converts a rotational operation of the zoom ring 29 into a linear movement to move the variable magnification lens 40. The variable magnification lens 40 is moved in the direction of the optical axis L by the driving of the zoom mechanism 36 to change an angle of view.

The camera main body 11 includes a main body controller 50, a shutter unit 51, a motor driver 52, an image memory 53, an image data processing section 54, an AF processing section 55, an LCD driver 56, a card interface (I/F) 57, a main body side storage section 58, and the like, in addition to the release switch 14, the solid-state imaging element 21, the rear surface display section 22 and the EVF panel 59 described above, which are connected to each other through a busline 60.

The main body controller 50 corresponds to a controller of the invention, and includes a CPU, a ROM that stores a program and parameters used in the CPU, a RAM used as a work memory of the CPU (not shown), and the like. The main body controller 50 controls the camera main body 11 and the respective units of the interchangeable lens 12 connected to the camera main body 11. An S1 signal and an S2 signal are input to the main body controller 50 from the release switch 14. Further, the body side signal contact 19A is connected to the main body controller 50.

The main body controller 50 transmits a control signal for moving the focus lens 39 in accordance with information on a rotating direction and a rotation amount of the focus ring 27 detected by the lens controller 31 to the lens controller 31. The lens controller 31 controls the motor driver 32 on the basis of the control signal to move the focus lens 39.

The main body controller 50 transmits a control signal for operating the stop unit 41 in accordance with information on a rotating position of the stop operating ring 28 detected by the lens controller 31 to change a stop diameter to the lens controller 31. The lens controller 31 controls the motor driver 32 on the basis of the control signal from the main body controller 50, and controls a stop diameter of the stop unit 41 so that an F number corresponding to a rotating position of the stop operating ring 28 is obtained.

The shutter unit 51 is a so-called focal plane shutter, and is disposed between the mount 19 and the solid-state imaging element 21. The shutter unit 51 is provided to be able to shield an optical path between the imaging optical system 26 and the solid-state imaging element 21, and is changed between an open state and a closed state. The shutter unit 51 is in the open state when a live view image and a motion picture are captured. The shutter unit 51 temporarily enters the closed state from the open state when a still image is captured. The shutter unit 51 is driven by the shutter motor 61. The motor driver 52 controls driving of the shutter motor 61.

The solid-state imaging element 21 is drive-controlled by the main body controller 50. The solid-state imaging element 21 forms an imaging section together with the shutter unit 51, the image data processing section 54, and the like. The imaging section performs imaging in a state where the interchangeable lens 12 is mounted on the mount 19. The solid-state imaging element 21 is a CMOS type image sensor, for example, and has a light-receiving surface formed by a plurality of pixels (not shown) that are arranged in a two-dimensional matrix form. Each pixel includes a photoelectric conversion element, and photoelectrically converts a subject image formed on the light-receiving surface by the interchangeable lens 12 to generate an imaging signal. Further, the solid-state imaging element 21 has an electronic shutter function, and is able to adjust a shutter speed (electric charge accumulation time).

Further, the solid-state imaging element 21 includes signal processing circuits (not shown) such as a noise rejection circuit, an auto gain controller, an A/D conversion circuit, and the like. The noise rejection circuit performs a noise rejection process with respect to an imaging signal. The auto gain controller amplifies the level of the imaging signal to an optimal value. The A/D conversion circuit converts the imaging signal into a digital signal, and outputs the result to the busline 60 from the solid-state imaging element 21. The output signal of the solid-state imaging element 21 corresponds to image data (so-called raw data) having one color signal for each pixel.

The image memory 53 stores image data corresponding to one frame output to the busline 60. The image data processing section 54 reads out image data corresponding to one frame from the image memory 53, and performs known image processing such as matrix operation, demosaicing processing, γ correction, brightness and color difference conversion, or resize processing.

The LCD driver 56 sequentially inputs image data corresponding to one frame that is subjected to image processing in the image data processing section 54 to the rear surface display section 22. The rear surface display section 22 sequentially displays a live view image at a predetermined cycle. The card I/F 57 is embedded in a card slot (not shown) provided in the camera main body 11, and is electrically connected to the memory card 62 inserted in the card slot. The card I/F 57 stores image data that is subjected to image processing in the image data processing section 54 in the memory card 62. Further, in a case where image data stored in the memory card 62 is reproduced and displayed, the card I/F 57 reads out the image data from the memory card 62.

In a case where a setting mode is selected by an operation of the operating button 23, the main body controller 50 drive-controls the LCD driver 56 to display the setting menu on the rear surface display section 22. The setting menu is able to set an imaging function of the imaging section formed by the solid-state imaging element 21, the shutter unit 51, the image data processing section 54, and the like. In a case where the main body controller 50 functions as a setting menu change section (which will be described later), a plurality of display setting items that are selected in accordance with a usage situation of a user from a plurality of setting items are displayed as the setting menu.

Figures 5, 6:
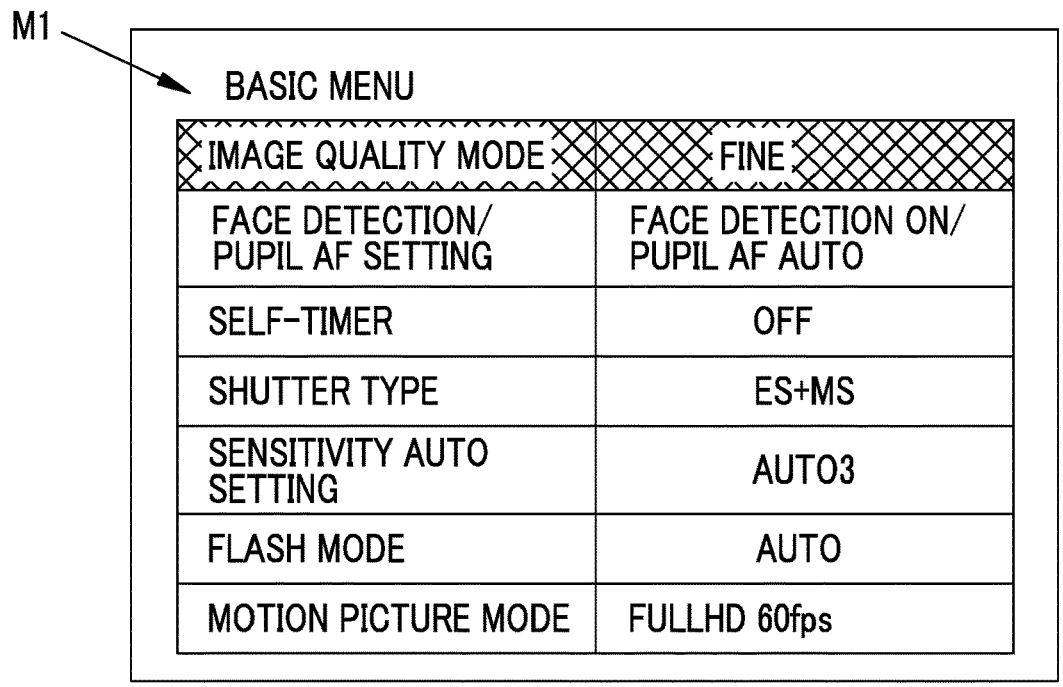
FIG. 5 is a diagram illustrating a display screen showing an example of a setting menu.
FIG. 6 is a diagram illustrating a display screen showing a selection candidate list in a case where a display setting item of an image quality mode is selected from the setting menu.

FIG. 5 shows a basic menu M1 for a beginner, which is an example of a setting menu displayed on the rear surface display section 22. In the basic menu M1, a plurality of display setting items such as an image quality mode, a face detection/pupil AF setting, a self-timer, a shutter type, a sensitivity AUTO setting, a flash mode, and a motion picture mode are displayed.

In a case where a user sets an imaging function on the basis of the basic menu M1, for example, the user selects one display setting item from the plurality of display setting items by operating the operating button 23. In the example shown in FIG. 5, the display setting item of the image quality mode is selected, which is shaded.

In a case where the display setting item of the image quality mode is selected, as shown in FIG. 6, an image quality mode selection candidate list including selection candidates such as "FINE", "NORMAL", "FINE+RAW", "NORMAL+RAW", and "RAW" is displayed. By operating the operating button 23, an image quality mode setting is selected from the selection candidate list. In the selection candidate list, "FINE" represents a high-quality mode in which an image having compression rate data lower than that in "NORMAL" is acquired. "RAW" represents a high-quality mode compared with that in "FINE", in which an image is recorded without compressing data. Further, "FINE+RAW" represents a mode in which images of both of "FINE" and "RAW" are acquired, and "NORMAL+RAW" represents a mode in which images of both of "NORMAL" and "RAW" are recorded.

In a case where the display setting item of the face detection/pupil AF setting is selected, as shown in FIG. 7, a face detection/pupil AF setting selection candidate list including selection candidates such as "face detection ON/pupil AF_OFF", "face detection ON/pupil AF_ON", and "face detection OFF/pupil AF_OFF" is displayed. In a case where "face detection ON/pupil AF_OFF" is selected from the selection candidate list, it is possible to detect the face of a human and to focus on the face. Further, in a case where "face detection ON/pupil AF_ON" is selected, it is possible to detect the face of the human and to focus on positions of the eyes. In a case where "face detection OFF/pupil AF_OFF" is selected, face detection is not performed.

In a case where the display setting item of the self-timer is selected, as shown in FIG. 8, a self-timer selection candidate list including selection candidates such as "OFF", "2 S", and "10 S" is displayed. In a case where "OFF" is selected from the selection candidate list, the self-timer is not used. On the other hand, in a case where "2 S" or "10 S" is selected, it is possible to use the self-timer for performing imaging 2 seconds or 10 seconds after the release switch 14 is fully pushed.

Further, in a case where the display setting item of the shutter type is selected, as shown in FIG. 9, a shutter type selection candidate list including selection candidates such as "MS", "ES", and "MS+ES" is displayed. In a case where "MS" is selected from the selection candidate list, it is possible to perform imaging using a mechanical shutter based on the shutter unit 51, and in a case where "ES" is selected, it is possible to perform imaging using an electronic shutter. Further, in a case where "MS+ES" is selected, it is possible to perform imaging in a state where one of the mechanical shutter and the electronic shutter suitable for a shutter speed, for example, is automatically selected.

In a case where the display setting item of the sensitivity AUTO setting is selected, as shown in FIG. 10, a sensitivity AUTO setting selection candidate list including "AUTO1" to "AUTO3" is displayed. The sensitivity AUTO setting refers to an upper limit ISO sensitivity setting in a case where an ISO sensitivity setting is adjusted to AUTO through an operation of the shutter speed/ISO sensitivity dial 16. In this example, "AUTO1" is set to ISO800, "AUTO2" is set to ISO1600, and "AUTO3" is set to ISO3200. In a case where the ISO sensitivity setting is adjusted to AUTO, the sensitivity of the solid-state imaging element 21 is automatically adjusted in a range equal to or smaller than the upper limit ISO sensitivity, selected from the sensitivity AUTO setting.

In a case where the display setting item of the flash mode is selected, as shown in FIG. 11, a selection candidate list of flash modes such as "AUTO", "flash on", "slow synchronization", "second-curtain synchronization", "commander", and "flash off" is displayed. Since an internal strobe is not provided in the camera 10, in a case where the external flash device 18 is mounted in the hot shoe 17, the flash mode may be selected.

In a case where "AUTO" is selected from the selection candidate list and in a case where it is determined that a subject is dark by a photometric sensor (not shown), a flash is automatically operated. On the other hand, in a case where "flash on" is selected, the flash is forcibly operated regardless of the ambient brightness. Further, in a case where "slow synchronization" is selected, the shutter speed becomes slow, and the flash is operated in synchronization with the shutter. In a case where "second-curtain synchronization" is selected, the flash is operated immediately before the shutter is closed. Further, in a case where "flash off" is selected, the flash is not operated regardless of the ambient brightness.

In a case where the display setting item of the motion picture mode is selected, as shown in FIG. 12, a selection candidate list of motion picture modes such as "FULLHD 60 fps", "FULLHD 30 fps", "HD 60 fps", and "HD 30 fps" is displayed. In a case where "FULLHD 60 fps" is selected from the selection candidate list, FULLHD 60 fps represents a mode in which a full high vision motion picture having a frame rate of 60 fps (the number of frames per second is 60) is captured. Similarly, "FULLHD 30 fps" represents a mode in which a full high vision motion picture having a frame rate of 30 fps is captured, "HD 60 fps" represents a mode in which a high vision motion picture having a frame rate of 60 fps is captured, and "HD 30 fps" represents a mode in which a high vision motion picture having a frame rate of 30 fps is captured.

Figures 13, 14:
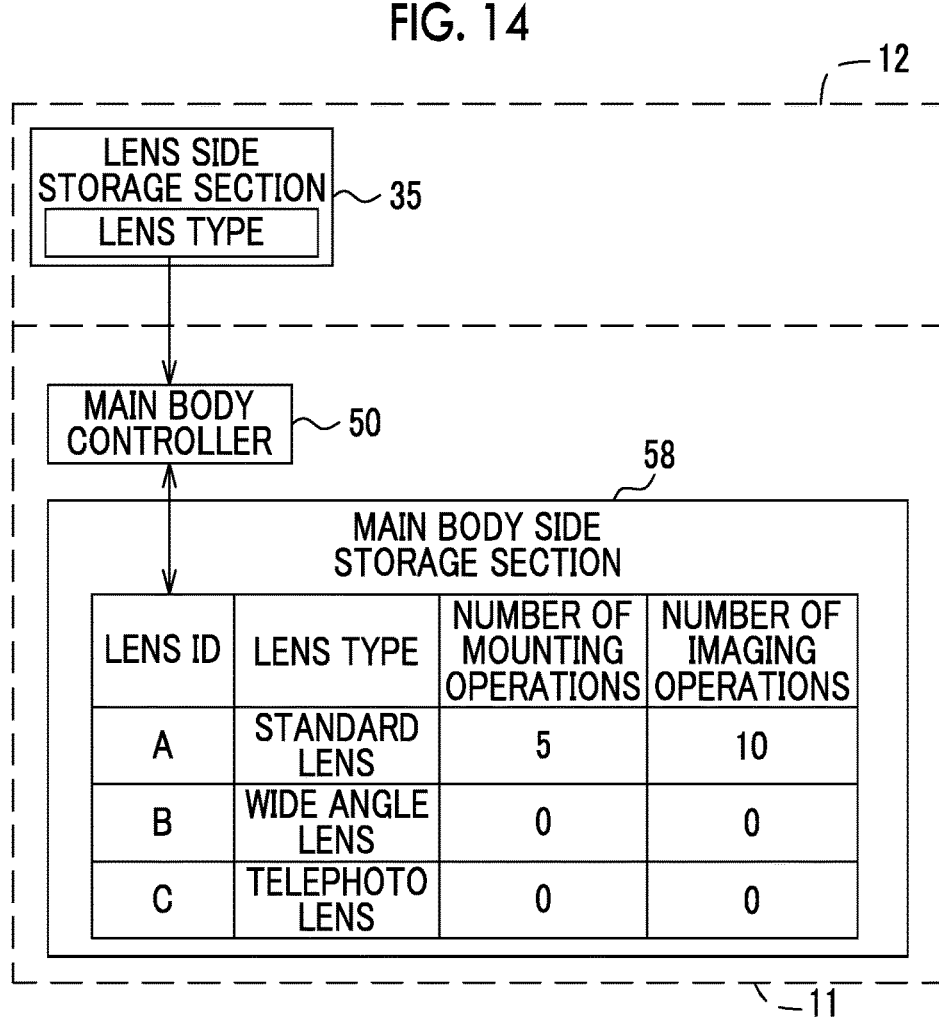
FIG. 13 is a diagram illustrating a display screen showing another example of a setting menu.
FIG. 14 is a schematic view illustrating a configuration in which the number of mounting operations and the number of imaging operations for each lens type are counted and stored in a main body side storage section.

Further, FIG. 13 shows a detailed menu M2 for an advanced level person, which is another example of a setting menu displayed on the rear surface display section 22. In the detailed menu M2, a plurality of display setting items such as an image size, an image quality mode, a recording type, a film simulation, a dynamic range, a white balance, a highlight tone, and the like are displayed. The display setting items shown in FIG. 13 are parts of the detailed menu M2, in which only setting items relating to image quality are displayed, for example. The detailed menu M2 may be formed to have a plurality of pages, and a plurality of display setting items may be displayed on each page. In addition, in this case, it is possible to perform switching between the pages of the detailed menu M2 using the operating button 23. As the detailed menu, setting items relating to focus, bracketing, and automatic dimming, in addition to the above-described setting items relating to the image quality, are used.

As shown in FIG. 14, the main body controller 50 functions as a lens type detection section that detects a lens type of the interchangeable lens 12 mounted on the mount 19. Specifically, in a case where the interchangeable lens 12 is mounted on the mount 19, the main body controller 50 acquires the lens type of the interchangeable lens 12 through the signal contacts 19A and 30A and the lens controller 31, from the lens side storage section 35 of the interchangeable lens 12.

The main body controller 50 counts the number of mounting operations of the interchangeable lens 12 mounted on the mount 19 and the number of imaging operations using the imaging section, for each lens type of the interchangeable lens 12 acquired from the lens side storage section 35, and stores the result in the main body side storage section 58. The main body side storage section 58 is formed of the same non-volatile memory as in the lens side storage section 35, for example.

As in the example shown in FIG. 14, the main body controller 50 acquires a lens type such as a standard lens, a wide angle lens, or a telephoto lens, counts the number of mounting operations and the number of imaging operations for each lens type, and stores the result in the main body side storage section 58.

Further, the main body controller 50 functions as a setting menu change section. Specifically, in a case where the interchangeable lens 12 is mounted on the mount 19, the main body controller 50 changes a setting menu in accordance with the lens type of the interchangeable lens 12 acquired from the lens side storage section 35, and the number of mounting operations and the number of imaging operations corresponding to the lens type of the interchangeable lens 12 among the number of mounting operations and the number of imaging operations stored in the main body side storage section 58.

In a case where the lens type acquired from the lens side storage section 35 is a specific lens type, the main body controller 50 changes a setting menu. In this embodiment, the standard lens is detected as the specific lens type. The standard lens refers to a zoom lens in which a focus of an imaging optical system is variable, such as the interchangeable lens 12 in the embodiment, which is a standard zoom lens sold as a set together with the camera main body 11.

In this embodiment, in a case where the lens type acquired from the lens side storage section 35 is the standard lens, the main body controller 50 performs weighting with respect to the above-described number of mounting operations read out from the main body side storage section 58 using a weight value proportional to the number of imaging operations. Further, the main body controller 50 changes the setting menu in accordance with the weighted number of mounting operations. Specifically, in a case where the weighted number of mounting operations is equal to or greater than a setting value, the main body controller 50 changes the setting menu. More specifically, the main body controller 50 changes the above-described detailed menu M2 to the basic menu M1. That is, the main body controller 50 changes a display setting item to be displayed as the setting menu.

Figure 15:
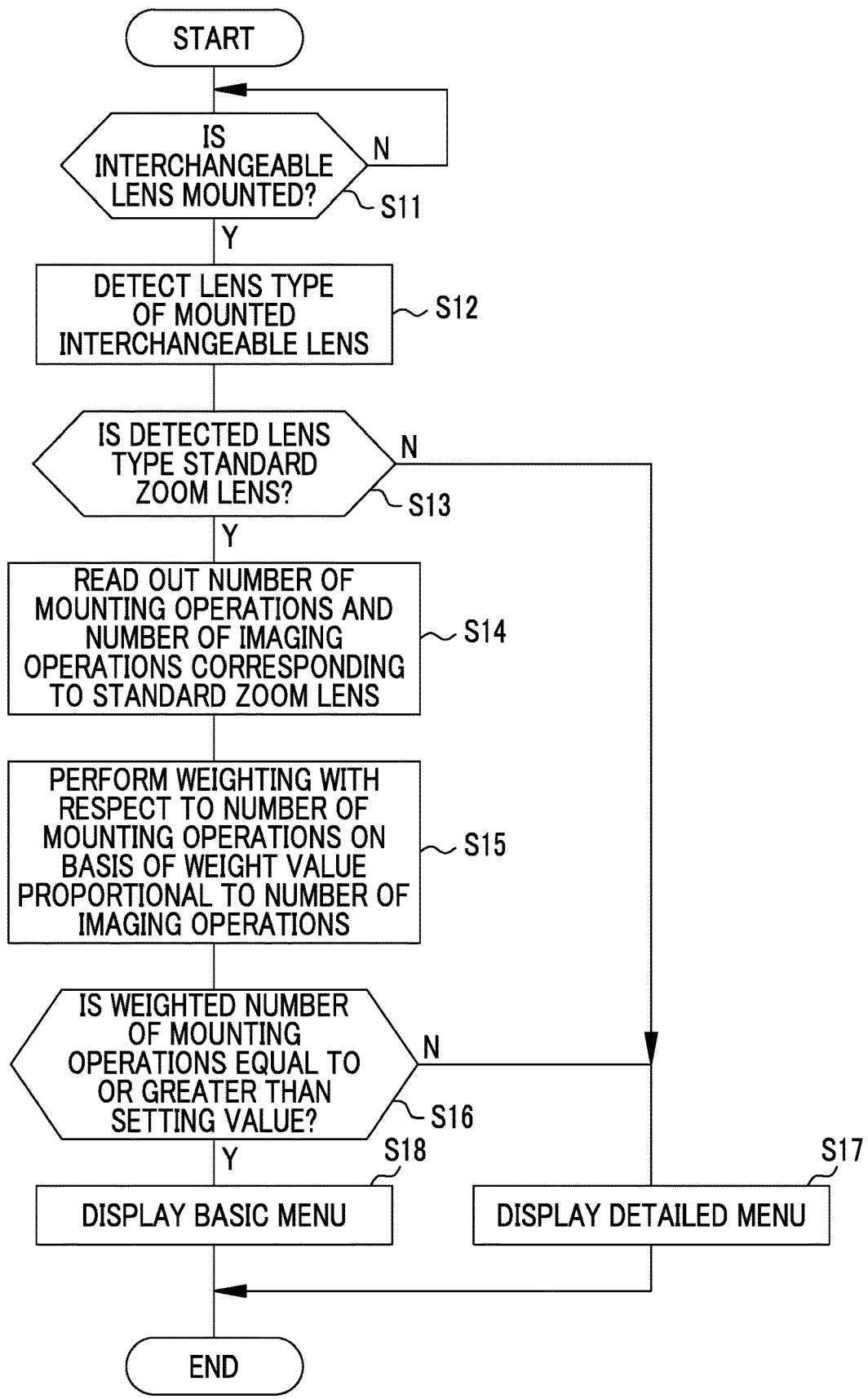
FIG. 15 is a flowchart illustrating a process in a case where a setting menu is displayed in a setting mode.

A processing procedure for changing the setting menu in accordance with the lens type of the interchangeable lens 12 and the number of mounting operations and the number of imaging operations corresponding to the lens type of the interchangeable lens 12 will be described with reference to a flowchart shown in FIG. 15. In the example shown in FIG. 15, before the interchangeable lens 12 is mounted, an initial setting in which the detailed menu M2 is displayed as a setting menu is performed.

In a case where the camera 10 is in a setting mode and the interchangeable lens 12 is mounted on the camera main body 11 (Y in S11), the main body controller 50 acquires a lens type from the lens side storage section 35 of the mounted interchangeable lens 12 to detect the lens type of the interchangeable lens 12 (S12).

Then, the main body controller 50 determines whether the detected lens type is the standard lens (S13). In a case where the lens type is the standard lens (Y in S13), the number of mounting operations and the number of imaging operations corresponding to the standard lens are read out from the main body side storage section 58 (S14). In a case where the lens type is not the standard lens (N in S13), the setting menu is not changed. That is, the detailed menu M2 is displayed (S17).

On the basis of the number of mounting operations and the number of imaging operations read out in S14, weighting with respect to the number of mounting operations is performed on the basis of a weight value proportional to the number of imaging operations (S15). In a case where the number of mounting operations weighted in S15 is equal to or greater than a setting value (Y in S16), the setting menu is changed. In this embodiment, the setting menu is changed from the detailed menu M2 displayed as the initial setting to the basic menu M1 (S18). On the other hand, in a case where the number of mounting operations weighted in S15 is smaller than the setting value (N in S16), the setting menu is not changed (S17).

Particularly, a beginner user, a user who has just purchased the camera 10, or the like among users who use the camera 10 usually uses the standard lens, and in this case, the basic menu M1 for a beginner is suitable. In this way, the camera 10 may display a setting menu suitable for a usage situation of each user.

Further, since the setting menu is changed in accordance with the number of mounting operations weighted on the basis of the weight value proportional to the number of imaging operations, it is possible to display the setting menu suitable for a usage situation of each user through determination with higher accuracy. In this embodiment, the weighting using the weight value proportional to the number of imaging operations is performed with respect to the number of mounting operations read out from the main body side storage section 58, but the invention is not limited thereto, and weighting may be performed with respect to the number of imaging operations read out from the main body side storage section 58 using a weight value proportional to the number of mounting operations. In this case, in a case where the weighted number of imaging operations is equal to or greater than a setting value, the setting menu is changed.

In the first embodiment, in accordance with the lens type of the interchangeable lens 12 acquired from the lens side storage section 35 and the number of mounting operations and the number of imaging operations corresponding to the lens type of the interchangeable lens 12 among the number of mounting operations and the number of imaging operations stored in the main body side storage section 58, the setting menu is changed from the detailed menu to the basic menu. That is, the display setting items to be displayed as the setting menu are changed, but the invention is not limited thereto, and the order of the display setting items may be changed. For example, in a case where the specific lens type is the standard lens and the weighted number of mounting operations or the weighted number of imaging operations is equal to or greater than a setting value, the display setting items for a beginner are disposed at a position above the setting menu before change.

Alternatively, the number of display setting items to be displayed as the setting menu may be changed. For example, in a case where the lens type acquired from the lens side storage section 35 is the standard lens that is the specific lens type and the weighted number of mounting operations or the weighted number of imaging operations is equal to or greater than the setting value, display setting items that are not prepared for a beginner are deleted from the setting menu before change. In this way, in a case where the number of display setting items displayed as the setting menu is set to be smaller than the initial value, it is preferable to delete at least one display setting item among a focus setting item, a flash setting item, and a motion picture setting item.

Second Embodiment

In the first embodiment, an example in which in a case where one type of interchangeable lens 12 that is a specific lens type is used as a target and a lens type acquired from the lens side storage section 35 is the specific lens type, a setting menu is changed in accordance with the number of mounting operations and the number of imaging operations corresponding to the lens type of the interchangeable lens 12 is shown, but the invention is not limited thereto. In a second embodiment to be described below, in a case where a plurality of types of interchangeable lenses 12 that are specific lens types are used as targets and lens types acquired from the lens side storage section 35 are the specific lens types, a setting menu is changed in accordance with total sums of the numbers of mounting operations and the numbers of imaging operations corresponding to the plurality of types of interchangeable lenses 12 that are the specific lens types.

Figure 16:
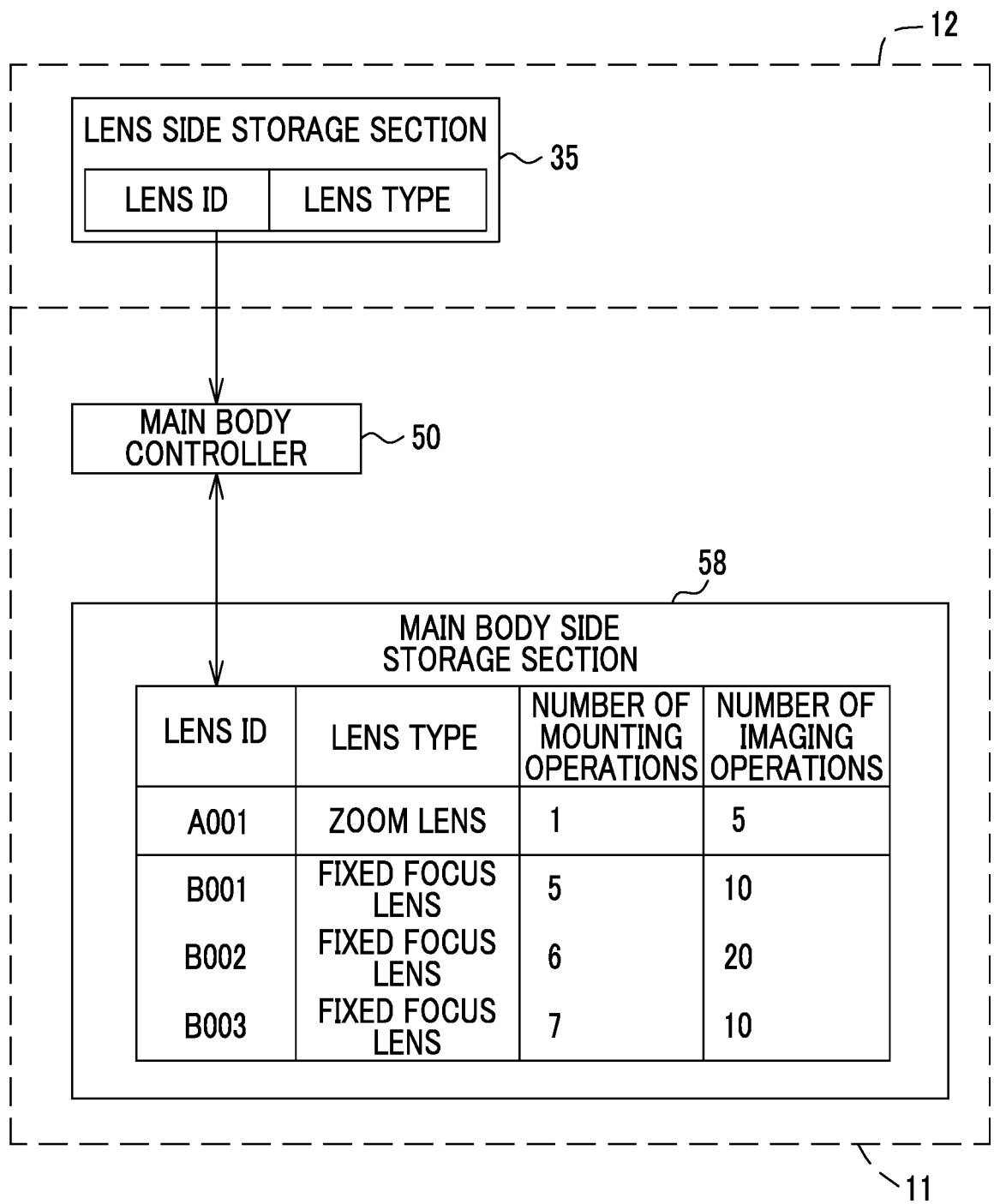
FIG. 16 is a schematic view illustrating a configuration in which the number of mounting operations and the number of imaging operations for each lens type are counted and stored in a main body side storage section according to a second embodiment.

In the second embodiment, as shown in FIG. 16, a fixed focus lens is used as a specific lens type. The fixed focus lens refers to an interchangeable lens 12 in which a variable magnification lens and a zoom mechanism are not provided and a focal length of an imaging optical system is fixed. Further, a lens type and a lens ID are stored in the lens side storage section 35. In a case where the interchangeable lenses 12 are mounted on the mount 19, the main body controller 50 acquires a lens type and a lens ID of each interchangeable lens 12 from the lens side storage section 35.

The main body controller 50 counts the number of mounting operations of the interchangeable lens 12 on the mount 19, and the number of imaging operations of the imaging section, with respect to the lens type and the lens ID of each interchangeable lens 12 acquired from the lens side storage section 35, and stores the result in the main body side storage section 58. In the example shown in FIG. 16, a lens type such as a zoom lens or a fixed focus lens, and a lens ID are acquired, and the number of mounting operations and the number of imaging operations are stored in the main body side storage section 58. Further, with respect to a zoom lens having a lens ID of "A001" and fixed focus lenses having lens IDs of "B001" to "B003", the number of mounting operations and the number of imaging operations are stored in the main body side storage section 58.

In a case where lens types acquired from the lens side storage section 35 are fixed focus lenses, the main body controller 50 reads out the number of mounting operations and the number of imaging operations corresponding to the plurality of types of interchangeable lenses 12 that are the fixed focus lenses from the main body side storage section 58. Further, the main body controller 50 performs weighting with respect to a total sum of the numbers of mounting operations read out from the above-described main body side storage section 58 using a weight value proportional to a total sum of the numbers of imaging operations. Further, the main body controller 50 changes a setting menu in accordance with the weighted total sum of the numbers of mounting operations. Specifically, in a case where the weighted total sum of the numbers of mounting operations is equal to or greater than a setting value, the setting menu is changed, and more specifically, the above-described basic menu M1 is changed to the detailed menu M2.

Figure 17:
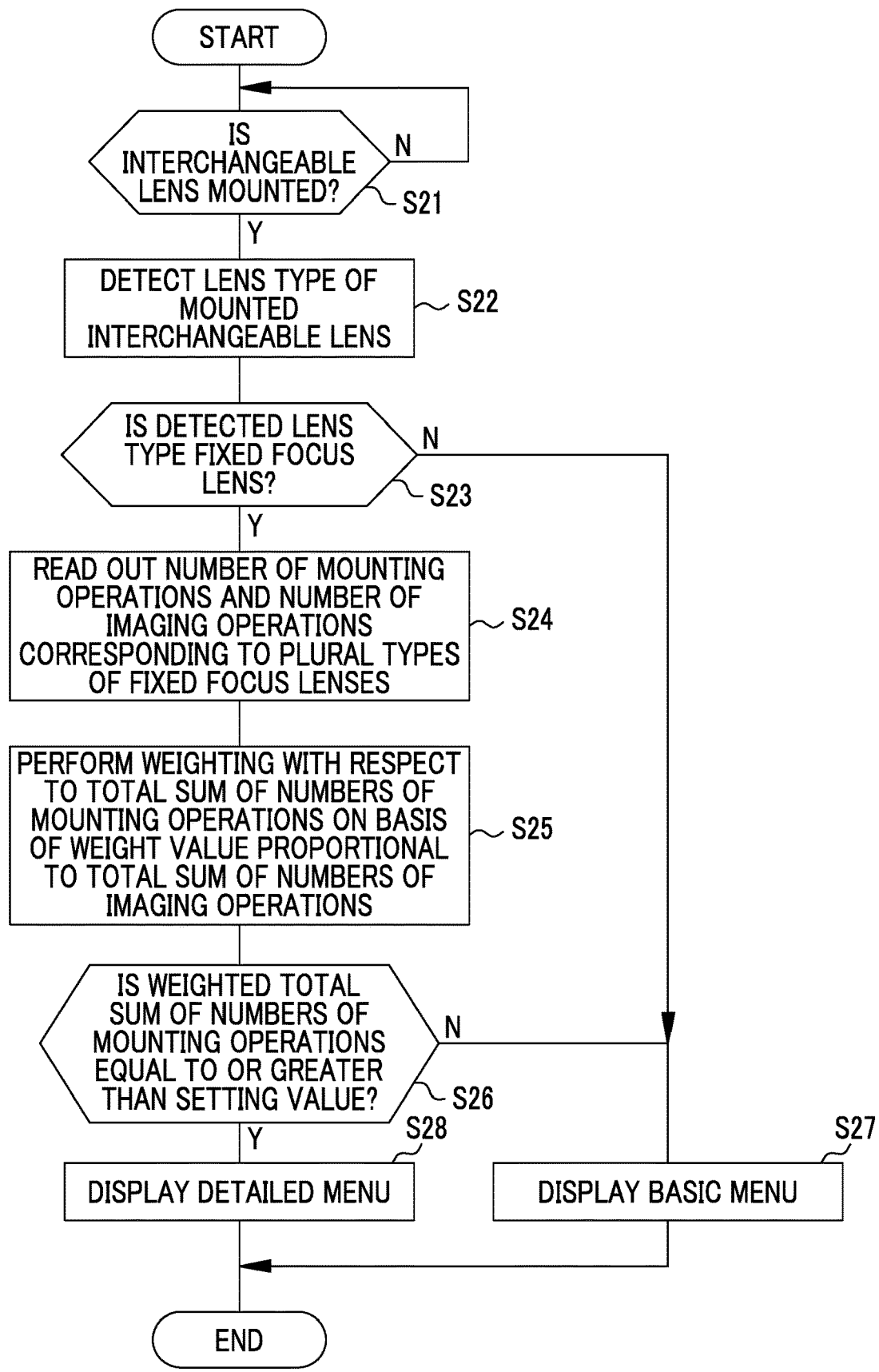
FIG. 17 is a flowchart illustrating a process in a case where a setting menu is displayed in a setting mode according to the second embodiment.

In a case where detected interchangeable lenses 12 are specific lens types, a processing procedure for changing a setting menu in accordance with total sums of the numbers of mounting operations and the numbers of imaging operations corresponding to the plurality of types of interchangeable lenses 12 that are the specific lens types will be described with reference to a flowchart shown in FIG. 17. In the example shown in FIG. 17, before the interchangeable lenses 12 are mounted, an initial setting in which the basic menu M1 is displayed as a setting menu is performed.

In a case where the camera 10 is in a setting mode and the interchangeable lenses 12 are mounted on the camera main body 11 (Y in S21), the main body controller 50 detects lens types and lens IDs of the mounted interchangeable lenses 12 from the lens side storage sections 35 of the interchangeable lenses 12 (S22).

Then, the main body controller 50 determines whether the detected lens types are the fixed focus lenses (S23). In a case where the lens types are the fixed focus lenses (Y in S23), the number of mounting operations and the number of imaging operations corresponding to the plurality of types of fixed focus lenses are read out from the main body side storage section 58 (S24). In the example shown in FIG. 16, the number of mounting operations and the number of imaging operations are read out with respect to the fixed focus lenses of "B001" to "B003". In a case where the lens types are not the fixed focus lenses (N in S23), the setting menu is not changed (S27).

On the basis of the number of mounting operations and the number of imaging operations read out in S24, weighting with respect to a total sum of the numbers of mounting operations is performed on the basis of a weight value proportional to a total sum of the numbers of imaging operations (S25). In a case where the total sum of the numbers of mounting operations weighted in S25 is equal to or greater than a setting value (Y in S26), the setting menu is changed. In this embodiment, the setting menu is changed from the basic menu M1 displayed as the initial setting to the detailed menu M2 (S28). On the other hand, in a case where the total sum of the numbers of mounting operations weighted in S25 is smaller than the setting value (N in S26), the setting menu is not changed (S27).

Since a user called an advanced level person among users who use the camera 10 usually interchanges fixed focus lenses according to subjects, the detailed menu M2 for an advanced level person is suitable. In this way, the camera 10 may display a setting menu suitable for a usage situation of each user.

In the second embodiment, the lens type acquired from the lens side storage section 35 is the fixed focus lens that is the specific lens type, and the setting menu is changed from the basic menu to the detailed menu in accordance with the number of mounting operations and the number of imaging operations corresponding to the plurality of types of interchangeable lenses 12 that are the fixed focus lenses, read out from the main body side storage section 58, but the invention is not limited thereto, and the order of display setting items may be changed. For example, in a case where the specific lens type is the fixed focus lens and the weighted total sum of the numbers of mounting operations is equal to or greater than the setting value, display setting items for an advanced level person are disposed at a position above the setting menu before change.

Alternatively, the number of display setting items to be displayed as the setting menu may be changed. For example, in a case where the lens type acquired from the lens side storage section 35 is the fixed focus lens that is the specific lens type and the weighted total sum of the numbers of imaging operations is equal to or greater than the setting value, display setting items for an advanced level person are added to the setting menu before change. That is, the number of display setting items to be displayed as the setting menu is set to be larger than the initial value.

In the second embodiment, the weighting using the weight value proportional to the total sum of the numbers of imaging operations is performed with respect to the total sum of the numbers of mounting operations read out from the main body side storage section 58, but the invention is not limited thereto, and weighting using a weight value proportional to the total sum of the numbers of mounting operations may be performed with respect to the total sum of the numbers of imaging operations read out from the main body side storage section 58. In this case, in a case where the weighted number of imaging operations is equal to or greater than a setting value, the setting menu is changed.

Third Embodiment

In the first and second embodiments, an example in which a setting menu is changed in accordance with the number of mounting operations and the number of imaging operations corresponding to a specific lens type or a plurality of types of interchangeable lenses that specific lens types is shown, but in a third embodiment to be described below, an accumulated mounting time in addition to the number of mounting operations and the number of imaging operations is counted, and a setting menu is changed in accordance with the number of mounting operations, the accumulated mounting time, and the number of imaging operations.

Figure 18:
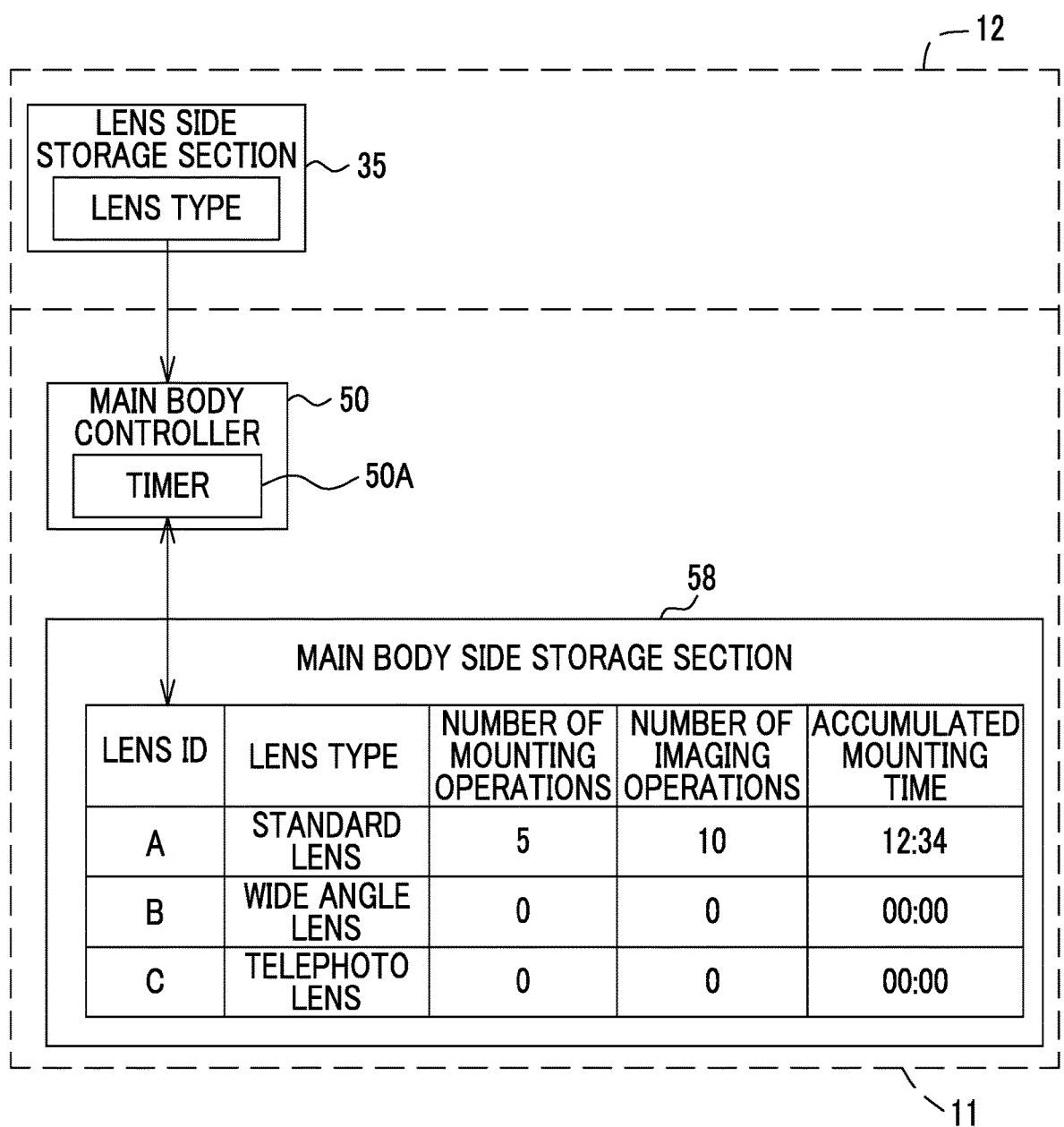
FIG. 18 is a schematic view illustrating a configuration in which the number of mounting operations and the number of imaging operations for each lens type are counted and stored in a main body side storage section according to a third embodiment.

In the third embodiment, as shown in FIG. 18, the main body controller 50 includes a timer 50A. Thus, the main body controller 50 counts an accumulated mounting time when the interchangeable lens 12 is mounted on the mount 19 for each lens type of interchangeable lens 12 acquired from the lens side storage section 35, and stores the result in the main body side storage section 58. The point that the main body controller 50 counts the number of mounting operations and the number of imaging operations of the imaging section for each lens type of the interchangeable lens 12 and stores the result in the main body side storage section 58 is the same as in the first embodiment.

In this embodiment, in a case where a lens type acquired from the lens side storage section 35 is a standard lens that is a specific lens type, the main body controller 50 reads out the number of mounting operations, the number of imaging operations, and an accumulated mounting time corresponding to the standard lens from the main body side storage section 58. Further, in a case where at least one of the number of mounting operations, the accumulated mounting time, or the number of imaging operations that is read out is equal to or greater than a setting value, the main body controller 50 changes a setting menu. Specifically, in a case where at least one of the number of mounting operations, the accumulated mounting time, or the number of imaging operations that is read out is equal to or greater than the setting value, the main body controller 50 changes the above-described detailed menu M2 to the basic menu M1.

Figure 19:
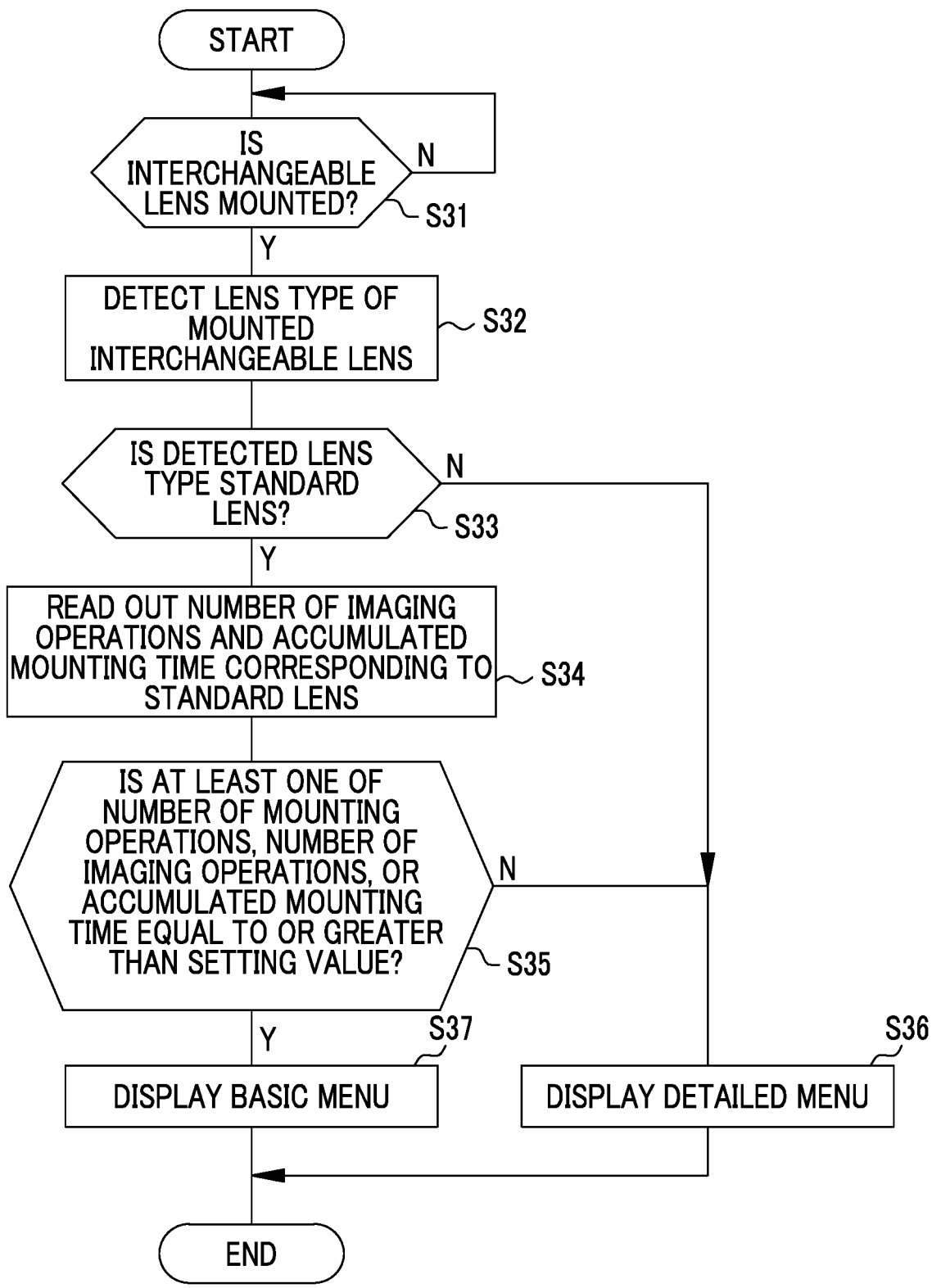
FIG. 19 is a flowchart illustrating a process in a case where a setting menu is displayed in a setting mode according to the third embodiment.

A processing procedure for changing the setting menu in accordance with the lens type of the interchangeable lens 12, and the number of mounting operations, the number of imaging operations and the accumulated mounting time corresponding to the lens type of the interchangeable lens 12 will be described with reference to a flowchart shown in FIG. 19. In the example shown in FIG. 19, before the interchangeable lens 12 is mounted, an initial setting in which the detailed menu M2 is displayed as a setting menu is performed.

In a case where the camera 10 is in a setting mode and the interchangeable lens 12 is mounted on the camera main body 11 (Y in S31), the main body controller 50 acquires a lens type from the lens side storage section 35 of the mounted interchangeable lens 12 to detect the lens type of the interchangeable lens 12 (S32).

Then, the main body controller 50 determines whether the detected lens type is the standard lens (S33). In a case where the lens type is the standard lens (Y in S33), the main body controller 50 reads out the number of mounting operations, an accumulated mounting time, and the number of imaging operations corresponding to the standard lens from the main body side storage section (S34). In a case where the lens type is not the standard lens (N in S33), the main body controller 50 does not change a setting menu (S36).

In a case where at least one of the number of mounting operations, the accumulated mounting time, or the number of imaging operations read out in S34 is equal to or greater than a setting value (Y in S35), the main body controller 50 changes the setting menu. In this embodiment, the main body controller 50 changes the setting menu from the detailed menu M2 displayed as the initial setting to the basic menu M1 (S37). On the other hand, in a case where all of the number of mounting operations, the accumulated mounting time, and the number of imaging operations read out in S34 are smaller than the setting value (N in S35), the main body controller 50 does not change the setting menu (S36).

Since the change of the setting menu is determined in accordance with the accumulated mounting time in addition to the number of mounting operations and the number of imaging operations, it is possible to display a setting menu suitable for a usage situation of a user through determination with higher accuracy, compared with the first and second embodiments.

In the third embodiment, the setting menu is changed in a case where at least one of the number of mounting operations, the number of imaging operations, or the accumulated mounting time is equal to or greater than the setting value, but the invention is not limited thereto. For example, weighting using a weight value proportional to any one of the number of mounting operations or the number of imaging operations may be performed with respect to the accumulated mounting time read out from the main body side storage section 58. In this case, in a case where the weighted accumulated mounting time is equal to or greater than a setting value, the setting menu is changed. Further, in the change of the setting menu that is performed in accordance with the specific lens type and the accumulated mounting time corresponding to the specific lens type, similar to the first embodiment, it is preferable to change display setting items to be displayed as the setting menu, to change the order of the display setting items to be displayed as the setting menu, or to change the number of the display setting items to be displayed as the setting menu.

In the third embodiment, an example in which in a case where one type of interchangeable lens 12 that is a specific lens type is used as a target and the detected interchangeable lens 12 is the specific lens type, a setting menu is changed in accordance with the number of mounting operations, the number of imaging operations, and the accumulated mounting times corresponding to the lens type of the interchangeable lens 12 is shown, but the invention is not limited thereto. Similar to the second embodiment, in a case where a plurality of types of interchangeable lenses that are specific lens types are used as targets and detected interchangeable lenses 12 are the specific lens types, the setting menu may be changed in accordance with total sums of the numbers of mounting operations, the numbers of imaging operations, and the accumulated mounting times corresponding to the plurality of types of interchangeable lenses 12 that are the specific lens types. In this case, in a case where the total sum of at least one of the numbers of mounting operations, the numbers of imaging operations, or the accumulated mounting times is equal to or greater than a setting value, the setting menu is changed.

Alternatively, weighting using a weight value proportional to the total sum of any one of the numbers of mounting operations or the numbers of imaging operations may be performed with respect to the total sum of the accumulated mounting times read out from the main body side storage section 58. In this case, in a case where the weighted total sum of the accumulated mounting times is equal to or greater than a setting value, the setting menu is changed.

Fourth Embodiment

Figure 20:
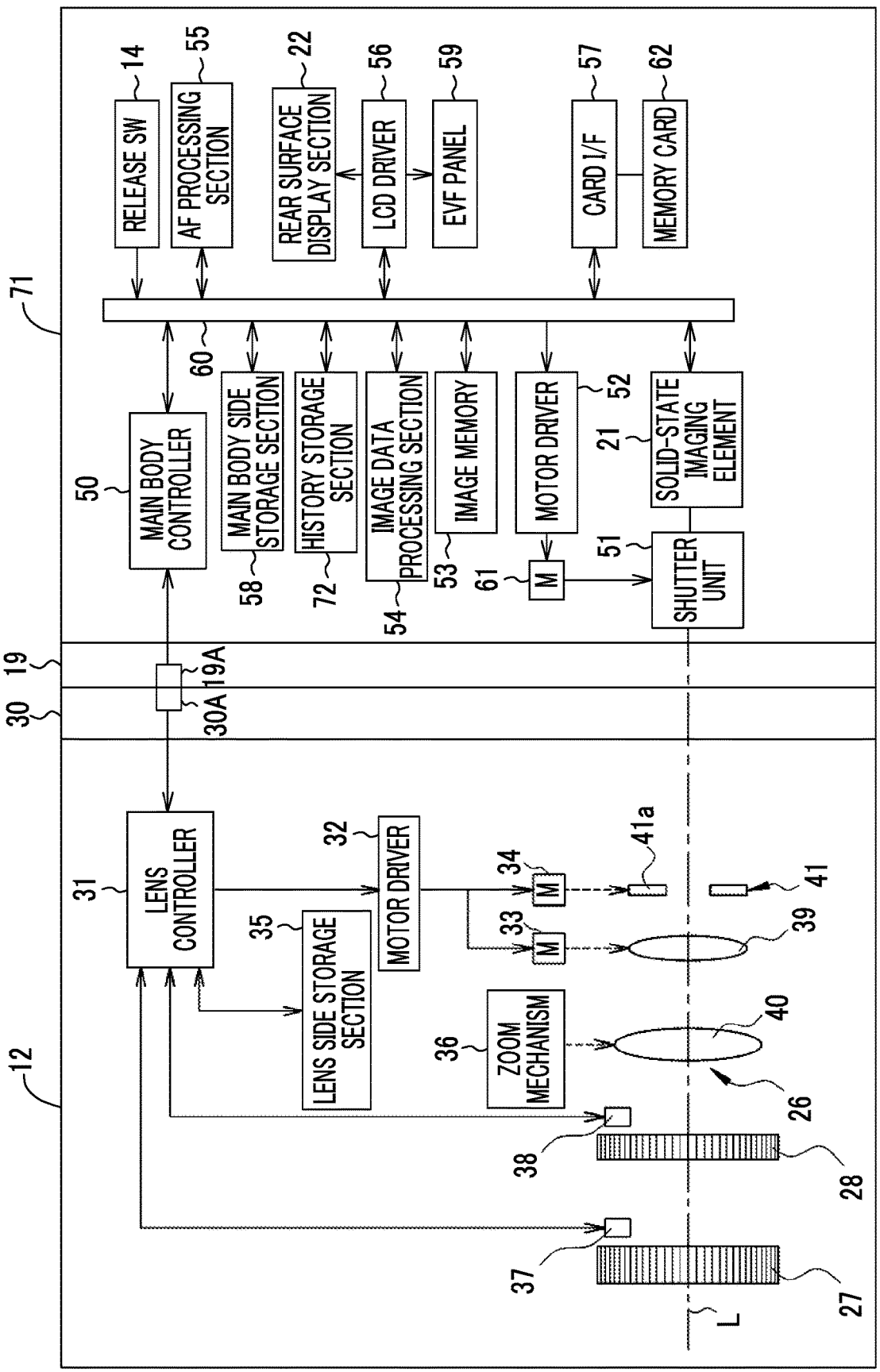
FIG. 20 is a block diagram showing a configuration of an interchangeable lens type digital camera according to a fourth embodiment.

In the third embodiment, an example in which a setting menu is changed in accordance with the number of mounting operations, an accumulated mounting time, and the number of imaging operations, but in a fourth embodiment to be described below, the setting menu is not merely changed, but instead, the setting menu returns to an initial value in accordance with the number of mounting operations, the accumulated mounting time, and the number of imaging operations. As shown in FIG. 20, a camera main body 71 according to this embodiment includes a history storage section 72 different from the lens side storage section 35 and the main body side storage section 58. The same reference numerals are given to the same components as in the first to third embodiments, and repetitive description thereof will not be performed.

In this embodiment, the main body controller 50 uses a plurality of types of interchangeable lenses 12 that are specific lens types as targets as in the second embodiment, and counts the number of mounting operations, the number of imaging operations, and an accumulated mounting time similar to the third embodiment and stores the result in the main body side storage section 58. Further, in a case where total sums of any two or more of the numbers of mounting operations, the accumulated mounting times, or the numbers of imaging operations corresponding to the plurality of types of interchangeable lenses 12 that are the specific lens types are equal to or greater than setting values, the main body controller 50 resets a setting menu to an initial value. Further, fixed focus lenses are used as the specific lens types.

In addition, in a case where the setting menu is reset to the initial value, the main body controller 50 that is the setting menu change section resets the number of counting operations stored in the main body side storage section 58 to the initial value, and stores the number of mounting operations, the accumulated mounting time, and the number of imaging operations of the imaging section before resetting stored for each lens type in the history storage section 72.

Figure 21:
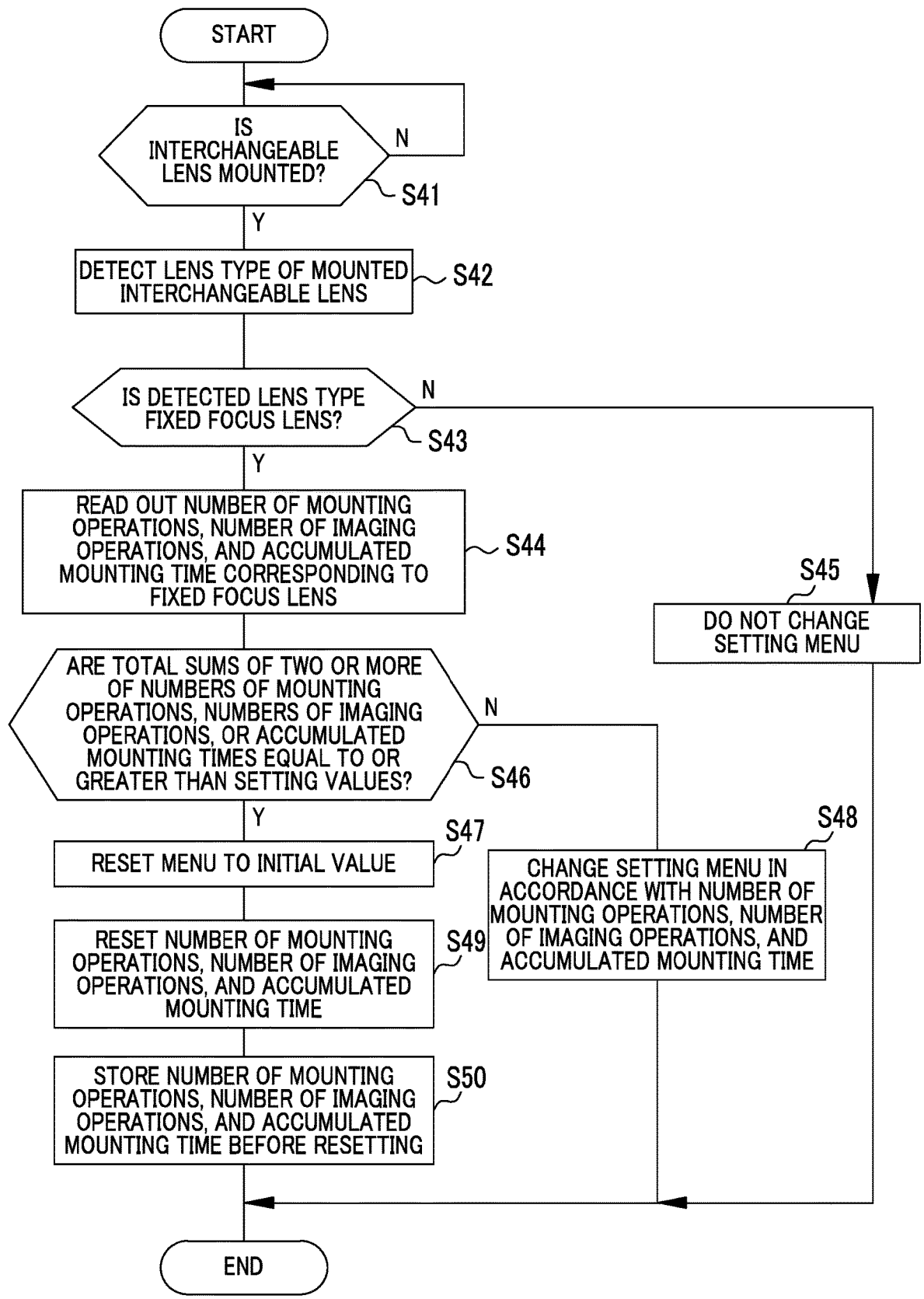
FIG. 21 is a flowchart illustrating a process in a case where a setting menu is displayed in a setting mode according to the fourth embodiment.

A processing procedure for returning the setting menu to the initial value in accordance with the lens type of the interchangeable lens 12, and the number of mounting operations, the number of imaging operations and the accumulated mounting times corresponding to the plurality of types of interchangeable lenses 12 that are the specific lens types will be described with reference to a flowchart shown in FIG. 21. In the example shown in FIG. 21, before the setting menu is reset, the basic menu M1 is set as an initial value.

In a case where the camera 10 is in a setting mode and the interchangeable lens 12 is mounted on the camera main body 11 (Y in S41), the main body controller 50 acquires a lens type from the lens side storage section 35 of the mounted interchangeable lens 12 to detect the lens type of the interchangeable lens 12 (S42).

Then, the main body controller 50 determines whether the detected lens type is the fixed focus lens (S43). In a case where the lens type is the fixed focus lens (Y in S43), the number of mounting operations, the number of imaging operations, and accumulated mounting times corresponding to the plurality of types of fixed focus lenses are read out from the main body side storage section 58 (S44). In a case where the lens type is not the fixed focus lens (N in S43), the setting menu is not changed (S45).

In a case where total sums of any two or more of the numbers of mounting operations, the accumulated mounting times, or the numbers of imaging operations read out in S44 are equal to or greater than setting values (Y in S46), the setting menu is reset to an initial value (S47). In this embodiment, the setting menu is returned to the basic menu M1 set as the initial value. On the other hand, in a case where the total sums of any two or more of the numbers of mounting operations, the accumulated mounting times, or the numbers of imaging operations read out in S44 are smaller than the setting values (N in S46), the same process as in the first to third embodiments is performed, and the setting menu is changed in accordance with the number of mounting operations, the accumulated mounting time, and the number of imaging operations (S48).

In a case where the setting menu is reset (S47), the number of mounting operations, the accumulated mounting time, and the number of imaging operations stored in the main body side storage section 58 are also reset (S49). Further, the number of mounting operations, the accumulated mounting time, and the number of imaging operations of the imaging section before resetting stored for each lens type are stored in the history storage section 72 (S50).

In a case where a plurality of types of interchangeable lenses 12 that are specific lens types are used as targets and total sums of two or more of the numbers of mounting operations, accumulated mounting times, or the numbers of imaging operations are equal to or greater than setting values, there is a high possibility that a user different from a user who usually uses the camera 10 uses the camera 10. Accordingly, in this case, since a setting menu is returned to an initial value, it is possible to display a setting menu suitable for a usage situation of the user who usually uses the camera 10.

Fifth Embodiment

Figure 22:
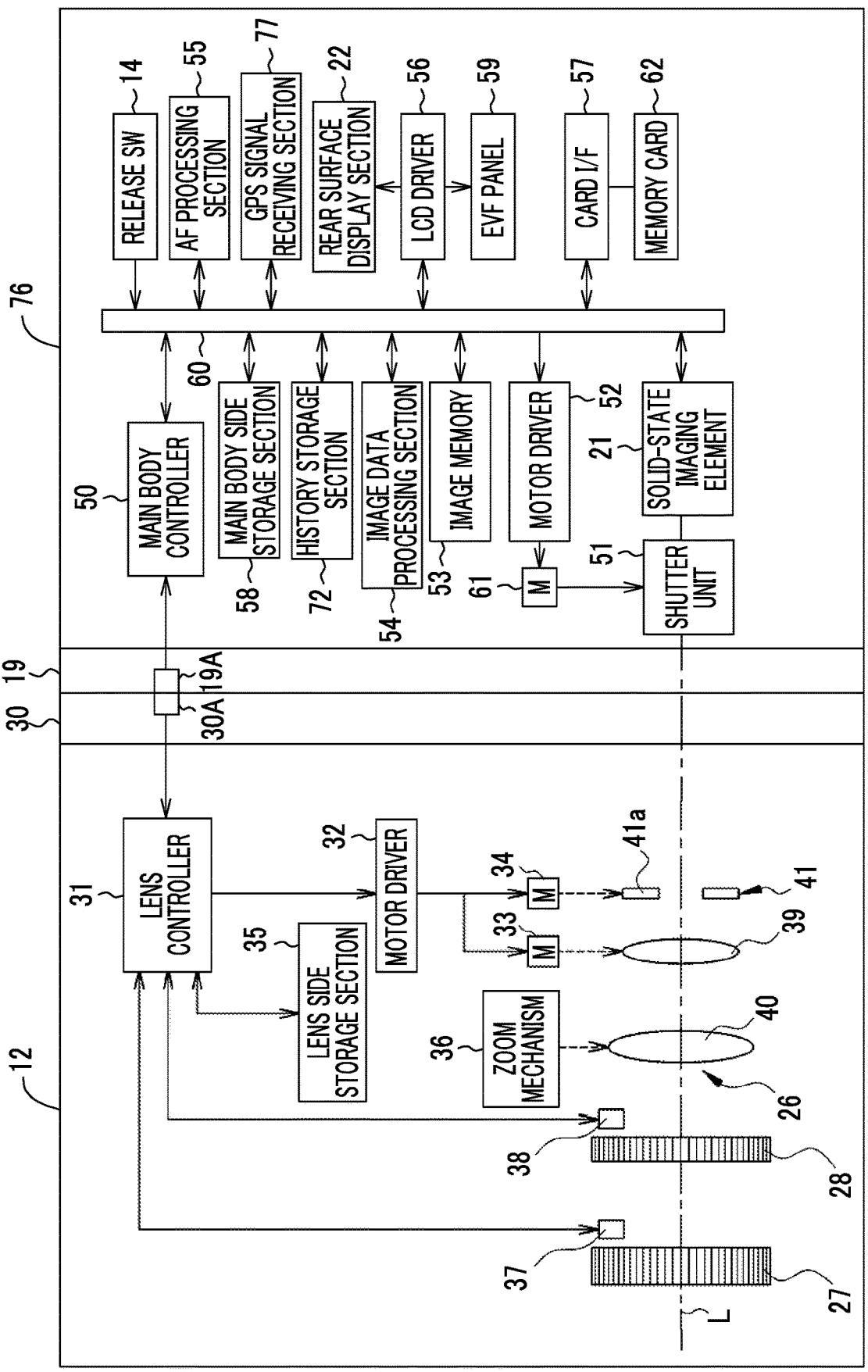
FIG. 22 is a block diagram showing a configuration of an interchangeable lens type digital camera according to a fifth embodiment.

In the first to fourth embodiments, an example in which a setting menu is changed in accordance with the number of mounting operations, the number of imaging operations, and an accumulated mounting time corresponding to a specific lens type or a plurality of types of interchangeable lenses that are specific lens types is shown, but in a fifth embodiment to be described below, position information and time point information are acquired, and a setting menu is changed on the basis of an imaging position, an imaging time point, and the like that are stored in association with each other. As shown in FIG. 22, a camera main body 76 in this embodiment includes a global positioning system (GPS) signal receiving section 77. The same reference numerals are given to the same components as in the first to fourth embodiment, and repetitive description thereof will not be performed.

The GPS signal receiving section 77 is a position information acquisition section that acquires current position information of the camera 10. In this embodiment, the main body controller 50 functions as a time point acquisition section that acquires a mounting time point when the interchangeable lens 12 is mounted on the mount 19, a mounting release time point when the interchangeable lens 12 is detached from the mount 19, and an imaging time point in the imaging section.

Figure 23:
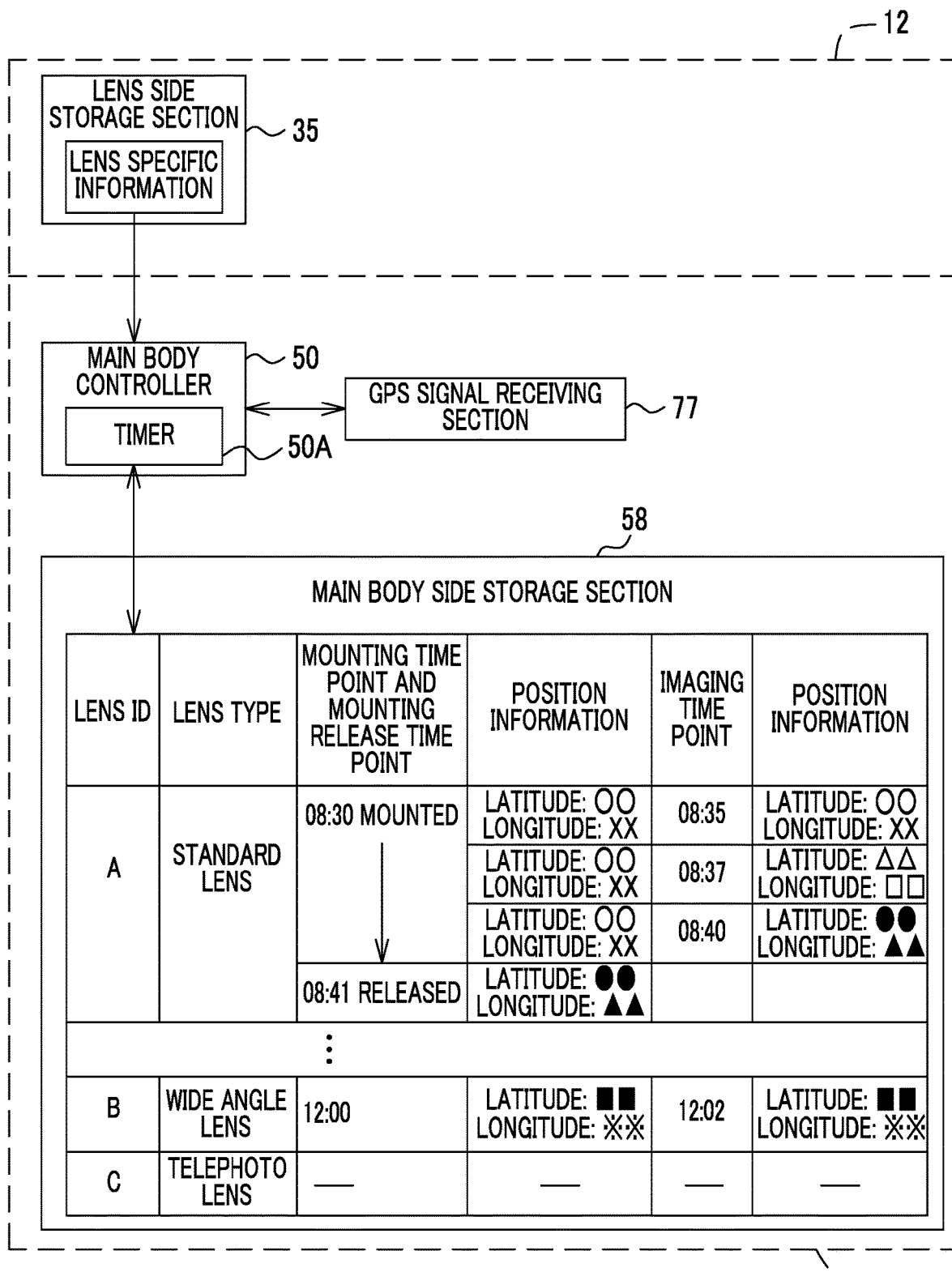
FIG. 23 is a schematic view illustrating a configuration in which the number of mounting operations and the number of imaging operations for each lens type are counted and stored in a main body side storage section according to the fifth embodiment.

As shown in the example of FIG. 23, the main body controller 50 stores position information acquired in the GPS signal receiving section 77 at the mounting time point, the mounting release time point and the imaging time point in the main body side storage section 58 in association with the mounting time point, the mounting release time point and imaging time point, for each lens type of the interchangeable lens 12. The invention is not limited thereto, similar to the first to fourth embodiment, for each lens type of the interchangeable lens 12, the number of mounting operations and the number of imaging operations are counted and are stored in the main body side storage section 58 together with the position information, the mounting time point, and the like.

As in the example shown in FIG. 23, the main body controller 50 acquires a lens type such as a standard lens, a wide angle lens, or a telephoto lens, acquires a mounting time point, a mounting release time point, and an imaging time point for each lens type, and stores position information acquired in the GPS signal receiving section 77 at the mounting time point, the mounting release time point, and the imaging time point in the main body side storage section 58. The position information stored in the main body side storage section 58 is position information including latitude and longitude.

In a case where a lens type acquired from the lens side storage section 35 is a specific lens type, the main body controller 50 reads out information stored in association with position information and an imaging time point that match at least one of current position information acquired in the GPS signal receiving section 77 or a current time point from the main body side storage section 58 in correspondence with the specific lens type. Here, the "matching" includes approximate matching, and for example, includes a case where at least one of current position information or a current time point, and position information and an imaging time point stored in the main body side storage section 58 are within a predetermined time difference or a predetermined distance range. Further, in this embodiment, the specific lens type is the standard lens.

Further, in a case where at least one of the number of mounting operations, an accumulated mounting time, or the number of imaging operations in a case where at least one of current position information or a current time point matches position information and an imaging time point stored in the main body side storage section 58 is equal to or greater than a setting value, the main body controller 50 changes a setting menu in correspondence with the specific lens type on the basis of the information read out from the main body side storage section 58.

Figure 24:
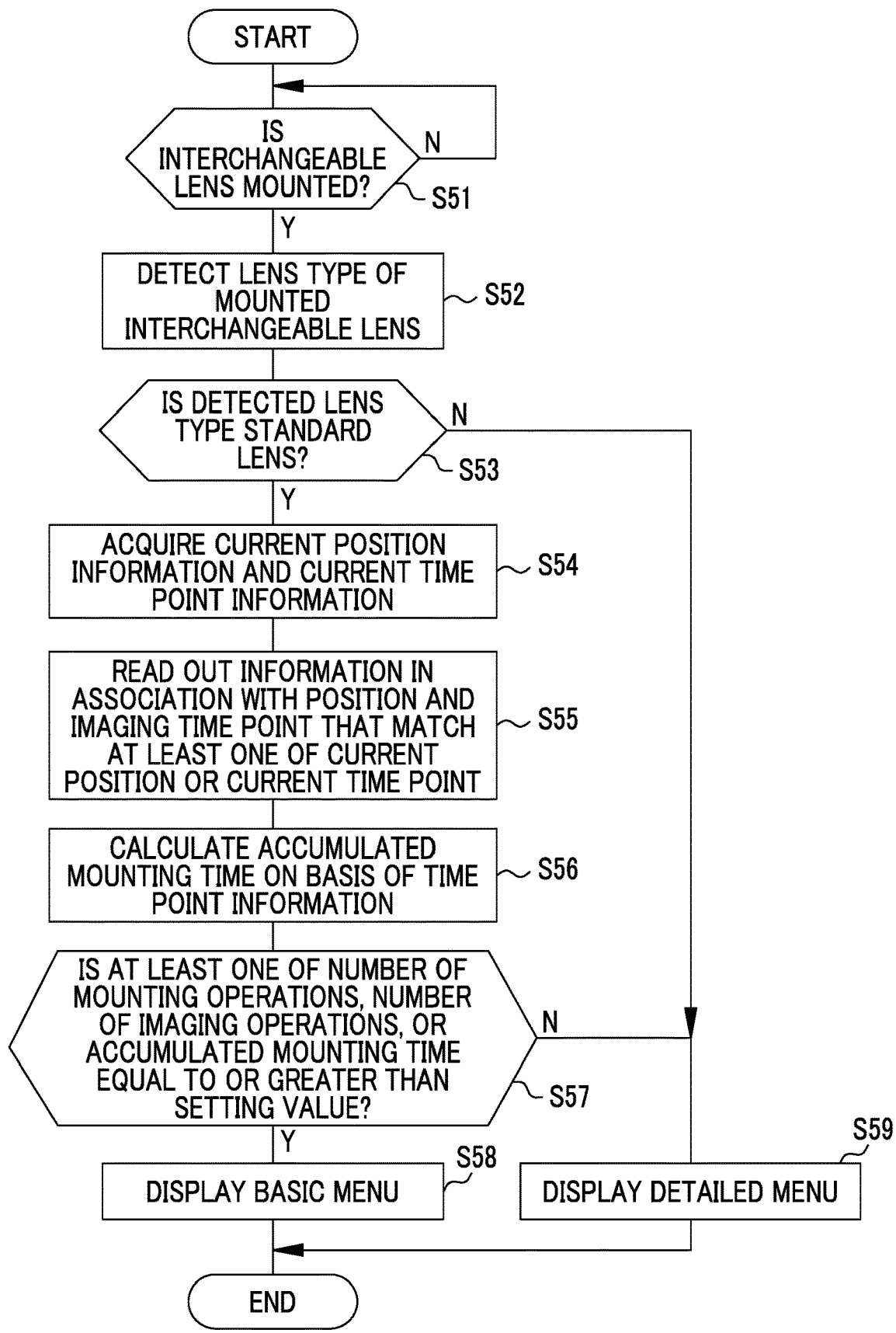
FIG. 24 is a flowchart illustrating a process in a case where a setting menu is displayed in a setting mode according to the fifth embodiment.

A processing procedure for acquiring position information and time point information and changing a setting menu on the basis of a previous imaging place, a previous imaging time point, or the like, will be described with reference to a flowchart shown in FIG. 24. In the example shown in FIG. 24, before the interchangeable lenses 12 are mounted, an initial setting in which the detailed menu M2 is displayed as a setting menu is performed.

In a case where the camera 10 is in a setting mode and the interchangeable lens 12 is mounted on the camera main body 11 (Y in S51), the main body controller 50 acquires a lens type from the lens side storage section 35 of the mounted interchangeable lens 12 to detect the lens type of the interchangeable lens 12 (S52).

Then, the main body controller 50 determines whether the detected lens type is the standard lens (S53). In a case where the lens type is the standard lens (Y in S53), the main body controller 50 acquires current position information and a current time point (S54). In a case where the lens type is not the standard lens (N in S53), the setting menu is not changed (S59).

Information stored in association with position information and an imaging time point that match at least one of current position information or a current time point acquired in S54 is read out from the main body side storage section 58 in correspondence with the standard lens (S55). The number of mounting operations, the number of imaging operations, and an accumulated mounting time are calculated from time point information of a mounting time point, a mounting release time point, and an imaging time point read out from S55 (S56). The number of mounting operations and the number of imaging operations may be counted by the main body controller 50 and may be stored in the main body side storage section 58 for use, in a similar way to the first to fourth embodiments.

In a case where at least one of the number of mounting operations, the accumulated mounting time, or the number of imaging operations calculated in S56 is equal to or greater than a setting value (Y in S57), the setting menu is changed. In this embodiment, the setting menu is changed from the detailed menu M2 displayed as the initial setting to the basic menu M1 (S58). On the other hand, in a case where all of the number of mounting operations, the accumulated mounting time, and the number of imaging operations calculated in S58 are smaller than the setting values (N in S57), the setting menu is not changed (S59).

As described above, since a setting menu is changed on the basis of time point information of a mounting time point, a mounting release time point, or an imaging time point stored in association with position information and an imaging time point that match at least one of current position information or a current time point, it is possible to perform determination in further consideration of position information and time point information in addition to the above-described respective embodiments, and thus, it is possible to display a setting menu suitable for a usage situation of a user through determination with higher accuracy.

Sixth Embodiment

In the fifth embodiment, an example in which position information and time point information are acquired and a setting menu is changed on the basis of an imaging position, an imaging time point, or the like stored in association therewith is shown, but in a sixth embodiment to be described below, the setting menu is not merely changed, and the setting menu is returned to an initial value on the basis of an imaging position and an imaging time point that match at least one of current position information or current time point information. A camera main body according to this embodiment has a configuration in which the history storage section 72 in the fourth embodiment is added to the respective components in the fifth embodiment.

In this embodiment, the main body controller 50 uses a plurality of types of interchangeable lenses 12 that are specific lens types as targets in a similar way to the second and fourth embodiments, acquires a mounting time point, a mounting release time point, and an imaging time point for each lens type in a similar way to the fifth embodiment, and stores position information acquired in the GPS signal receiving section 77 at the mounting time point, the mounting release time point, and the imaging time point in the main body side storage section 58 in association with the mounting time point, the mounting release time point, and the imaging time point.

Further, in a case where total sums of any two or more of the numbers of mounting operations, the accumulated mounting times, or the numbers of imaging operations in a case where at least one of current position information or a current time point matches position information and an imaging time point stored in the main body side storage section 58 are equal to or greater than setting values, the main body controller 50 resets a setting menu to an initial value, and stores the number of mounting operations, the accumulated mounting time, and the number of imaging operations of the imaging section before resetting, stored for each lens type, in the history storage section 72 in correspondence with a specific lens type. In addition, a fixed focus lens is used as the specific lens type.

Figure 25:
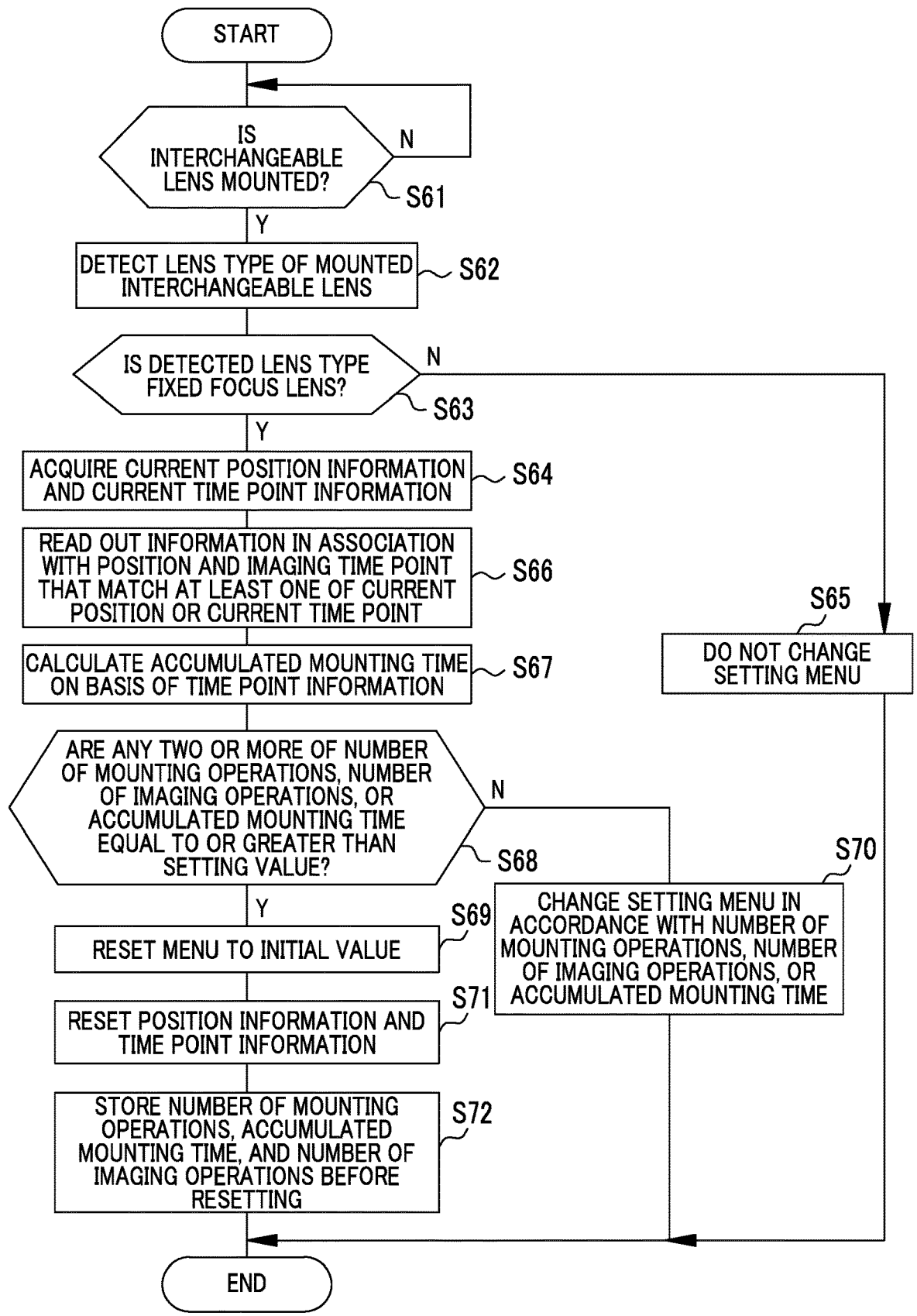
FIG. 25 is a flowchart illustrating a process in a case where a setting menu is displayed in a setting mode according to a sixth embodiment.

A processing procedure for acquiring position information and time point information and returning a setting menu to an initial value on the basis of a previous imaging place, a previous imaging time point, or the like will be described with reference to a flowchart shown in FIG. 25. In the example shown in FIG. 25, before the setting menu is reset, the basic menu M1 is used as an initial value.

In a case where the camera 10 is in a setting mode and the interchangeable lens 12 is mounted on the camera main body 11 (Y in S61), the main body controller 50 acquires a lens type from the lens side storage section 35 of the mounted interchangeable lens 12 to detect the lens type of the interchangeable lens 12 (S62).

Then, the main body controller 50 determines whether the detected lens type is the fixed focus lens (S63). In a case where the lens type is the fixed focus lens (Y in S63), the main body controller 50 acquires current position information and a current time point (S64). In a case where the lens type is not the fixed focus lens (N in S63), the setting menu is not changed (S65).

Information stored in association with position information and an imaging time point that match at least one of the current position information or the current time point acquired in S64 is read out from the main body side storage section 58 in correspondence with the fixed focus lens (S66). The number of mounting operations, the number of imaging operations, and an accumulated mounting time are calculated from time point information of a mounting time point, a mounting release time point, and an imaging time point read out from S66 (S67). The number of mounting operations and the number of imaging operations may be counted by the main body controller 50 and may be stored in the main body side storage section 58 for use, in a similar way to the first to fifth embodiments.

In a case where any two or more of the number of mounting operations, the accumulated mounting time, or the number of imaging operations calculated in S67 are equal to or greater than setting values (Y in S68), the setting menu is reset to the initial value (S69). In this embodiment, the setting menu is returned to the basic menu M1 set as the initial value. On the other hand, in a case where any two or more of the number of mounting operations, the accumulated mounting time, or the number of imaging operations calculated in S67 are smaller than the setting values (N in S68), the same process as in the fifth embodiment is performed, and the setting menu is changed in accordance with the number of mounting operations, the accumulated mounting time, and the number of imaging operations (S70).

In a case where the setting menu is reset (S69), the mounting time point, the mounting release time point, the imaging time point, and the position information for each lens type stored in association with the main body side storage section 58 are also reset (S71). Further, the number of mounting operations, the accumulated mounting time, and the number of imaging operations of the imaging section before resetting calculated in S67 are stored in the history storage section 72 (S72).

As described above, since a setting menu is reset on the basis of time point information or the like stored in association with position information and an imaging time point that match at least one of current position information or a current time point and determination is performed in further consideration of position information and time point information in addition to the fourth embodiment, it is possible to display a setting menu suitable for a usage situation of a user through determination with higher accuracy.

Figure 26:
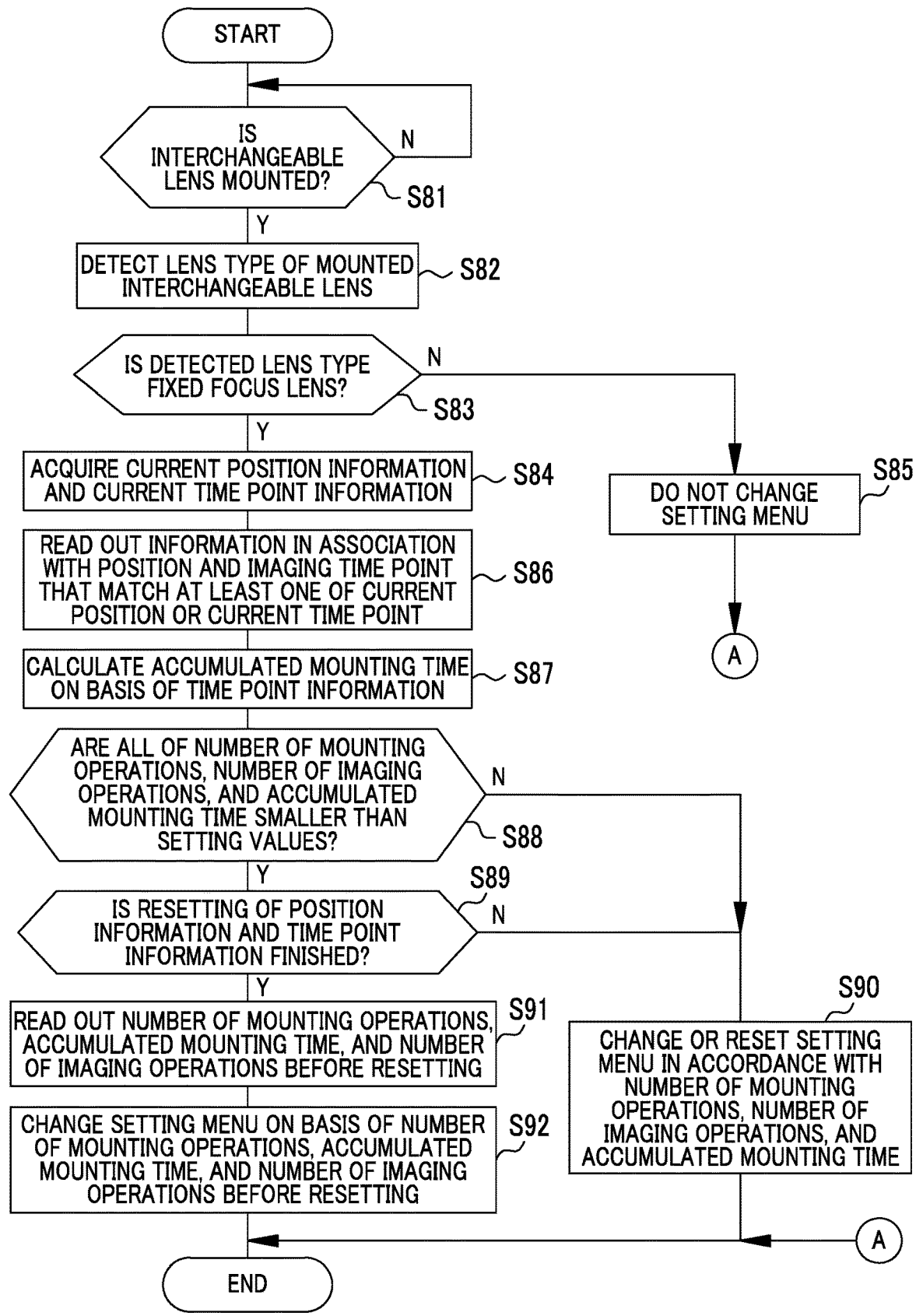
FIG. 26 is a flowchart illustrating a process in a case where a setting menu is displayed in a setting mode according to a modification example of the sixth embodiment.

As a modification example of the sixth embodiment, an example in which position information and time point information are read out for each lens type that is reset once and a setting menu is changed on the basis of the number of mounting operations, an accumulated mounting time, and the number of imaging operations of the imaging section before resetting will be described with reference to a flowchart shown in FIG. 26. In the example shown in FIG. 26, before the setting menu is reset, the basic menu M1 is set as an initial value.

In a case where the camera 10 is in a setting mode and the interchangeable lens 12 is mounted on the camera main body 11 (Y in S81), the main body controller 50 acquires a lens type from the lens side storage section 35 of the mounted interchangeable lens 12 to detect the lens type of the interchangeable lens 12 (S82).

Then, the main body controller 50 determines whether the detected lens type is the fixed focus lens (S83). In a case where the lens type is the fixed focus lens (Y in S83), the main body controller 50 acquires current position information and a current time point (S84). In a case where the lens type is not the fixed focus lens (N in S83), the main body controller 50 does not change the setting menu (S85).

Information stored in association with position information and an imaging time point that match at least one of the current position information or the current time point acquired in S84 is read out from the main body side storage section 58 in correspondence with the fixed focus lens (S86). The accumulated mounting time or the like is calculated from the time point information of the mounting time point, the mounting release time point, and the imaging time point read out in S86 (S87).

It is determined whether all of the number of mounting operations, the accumulated mounting time, and the number of imaging operations calculated in S87 are smaller than setting values (S88). In a case where all of the number of mounting operations, the accumulated mounting time, and the number of imaging operations are smaller than the setting values (Y in S88), the procedure proceeds to determination of whether a mounting time point, a mounting release time point, an imaging time point, and position information for each lens type, stored in the main body side storage section 58 in association with each other, are reset (S89).

On the other hand, in a case where at least one of the number of mounting operations, the accumulated mounting time, or the number of imaging operations is equal to or greater than the setting value (N in S88), similar to the sixth embodiment, the setting menu is changed or reset in accordance with the number of mounting operations, the accumulated mounting time, and the number of imaging operations (S90). In a case where the resetting is not finished in S89 (N in S89), similar to the sixth embodiment, the setting menu is changed or reset in accordance with the number of mounting operations, the accumulated mounting time, and the number of imaging operations (S90).

In a case where the mounting time point, the mounting release time point, the imaging time point, and the position information for each lens type are reset (Y in S89), the number of mounting operations, the accumulated mounting time, and the number of imaging operations of the imaging section before resetting stored in the history storage section 72 for each lens type are read out (S91). Further, on the basis of the number of mounting operations, the accumulated mounting time, and the number of imaging operations of the imaging section for each lens type read out in S91, the same processes as in the fifth embodiment are performed, and the setting menu is changed (S92).

As described above, since a setting menu may be changed on the basis of the number of mounting operations, an accumulated mounting time, and the number of imaging operations of the imaging section before resetting in accordance with a usage situation of a user, it is possible to display the setting menu suitable for the usage situation of the user through determination with high accuracy.

In the first, third, and fifth embodiments, the standard lens that is a zoom lens as a specific lens type is used as a target, but the invention is not limited thereto, and the fixed focus lens that is a specific lens type may be used as a target. For example, in a case where a detected lens type of the interchangeable lens 12 mounted on the mount 19 is the fixed focus lens and the number of mounting operations and the like corresponding to the fixed focus lens are equal to or greater than setting values, read out from the main body side storage section 58, similar to the second embodiment, it is preferable to set a setting menu to a detailed menu for an advanced level person, to dispose display setting items for an advanced level person at a position above the setting menu before change, or to add display setting items for an advanced level person to the setting menu before change.

As the display setting items for an advanced level person, settings relating to "AF+MF mode", "MF assist", or "depth of field scale" are employed, in addition to those described in the above respective embodiments. The "AF+MF mode" refers to an imaging mode that uses both functions of auto focus and manual focus. In a case where the "AF+MF mode" is turned on in the display setting items, focus adjustment may be performed in an auto focus manner in a state where a release switch 14 is half pushed. Further, in a case where the focus ring 27 is rotated in a state where the release switch 14 is half pushed, the focus adjustment may be performed in a manual focus manner.

Further, the setting relating to the "MF assist" is a setting relating to a display method for confirming a focus amount in a manual focus manner, for example, which includes a display method such as a split image in which focus amounts are indicated by two indexes spaced from each other, focus peaking for emphasizing a contour of a focused portion in display of a live view image, or the like.

Further, in the second, fourth, and sixth embodiments, the fixed focus lens that is a specific lens type is used as a target, but the invention is not limited thereto, and a zoom lens that is a specific lens type may be used as a target. For example, in a case where a detected lens type of the interchangeable lens 12 mounted on the mount 19 is the zoom lens and a total sum of the numbers of mounting operations and the like corresponding to a plurality of types of interchangeable lenses 12 that are the zoom lenses, read out from the main body side storage section 58 is equal to or larger than a setting value, similar to the first embodiment, it is preferable to set a setting menu to a basic menu for a beginner, to dispose display setting items for a beginner at a position above the setting menu before change, or to delete display setting items that are not for a beginner from the setting menu before change.

In the first to sixth embodiments, the standard lens and the fixed focus lens are detected as specific lens types, but the invention is not limited thereto. For example, a wide angle lens or a large diameter lens may be used as the specific lens type.

In a case where the wide angle lens is the specific lens type, for example, in a case where a detected lens type of the interchangeable lens 12 mounted on the mount 19 is the wide angle lens and a total sum of the numbers of mounting operations, or the like corresponding to the plurality of types of interchangeable lenses 12 that are the wide angle lenses is equal to or greater than a setting value, it is preferable to display display setting items suitable for scenery imaging as a setting menu. The scenery imaging includes natural imaging, a snap shot, or the like. As the display setting items suitable for the scenery imaging, for example, settings relating to focus or a photometric mode may be used.

In a case where a large diameter lens is the specific lens type, for example, in a case where a detected lens type of the interchangeable lens 12 mounted on the mount 19 is the large diameter lens and a total sum of at least one of the numbers of mounting operations, the numbers of imaging operations, or accumulated mounting times corresponding to the plurality of types of interchangeable lenses 12 that are the large diameter lenses is equal to or larger than a setting value, it is preferable to display display setting items suitable for night scene imaging or portrait imaging as a setting menu. As the display setting items suitable for night scene imaging or portrait imaging as a setting menu, settings relating to a dynamic range or flash may be used.

In the respective embodiments, the number of mounting operations, the number of imaging operations, an accumulated mounting time, and the like are counted for each lens type of the interchangeable lens 12 detected as the interchangeable lens 12 mounted on the mount 19 and are stored in the main body side storage section 58, but the invention is not limited thereto. For example, the number of mounting operations, the number of imaging operations, the accumulated mounting time, and the like for each lens type counted by the main body controller 50 may be transferred to the interchangeable lens 12 that is in the state of being mounted on the mount 19, and may be stored in the lens side storage section 35. In this case, the main body controller 50 changes a setting menu in accordance with the number of mounting operations, the number of imaging operations, the accumulated mounting time, and the like for each lens type read out from the lens side storage section 35 of the interchangeable lens 12.

In the above-described respective embodiments, a mirrorless single-lens type digital camera is shown as an example, but the invention may be applied to an interchangeable lens type digital camera such as a single-lens reflex type digital camera or the like.

EXPLANATION OF REFERENCES

10: interchangeable lens type digital camera
11, 71, 76: camera main body

12: interchangeable lens
13: power source lever
14: release switch
15: exposure correction dial
16: shutter speed/ISO sensitivity dial
17: hot shoe
18: external flash device
19: mount
19A: body side signal contact
20: optical finder window
21: solid-state imaging element
22: rear surface display section
23: operating button
24: finder eyepiece section
25: lens barrel
26: imaging optical system
27: focus ring
28: stop operating ring
29: zoom ring
30: lens mount
30A: lens side signal contact
31: lens controller
32: motor driver
33, 34: motor
35: lens side storage section
36: zoom mechanism
37, 38: sensor
39: focus lens
40: variable magnification lens
41: stop unit
41a: stop leaf blade
50: main body controller
50A: timer
51: shutter unit
52: motor driver
53: image memory
54: image data processing section
55: processing section
56: LCD driver
57: card I/F
58: main body side storage section
59: EVF panel
60: busline
61: shutter motor
61: shutter unit
62: memory card
72: history storage section
77: GPS signal receiving section
77: history storage section

What is claimed is:

1. An imaging device comprising:
a lens mounting section on which a plurality of types of interchangeable lenses are selectively mounted;
an imaging section that performs imaging in a state where the interchangeable lens is mounted on the lens mounting section;
a lens type detection section that detects a lens type of the interchangeable lens mounted on the lens mounting section;
a controller that counts the number of mounting operations of the interchangeable lens on the lens mounting section and the number of imaging operations of the imaging section, for each lens type of the interchangeable lens detected by the lens type detection section, and stores the result in a storage section provided in a device main body or the interchangeable lens;
a menu display section that displays a setting menu for setting an imaging function of the imaging section; and
a setting menu change section that changes, in a case where the interchangeable lens is mounted on the lens mounting section, the setting menu in accordance with the lens type detected by the lens type detection section and the number of mounting operations, and the number of imaging operations corresponding to the lens type detected by the lens type detection section among the number of mounting operations and the number of imaging operations stored in the storage section.

2. The imaging device according to claim 1,
wherein the menu display section displays a plurality of display setting items selected from a plurality of setting items, as the setting menu.

3. The imaging device according to claim 2,
wherein the setting menu change section changes the display setting items to be displayed as the setting menu, in accordance with the lens type and the number of mounting operations.

4. The imaging device according to claim 3,
wherein the setting menu change section uses the number of mounting operations weighted on the basis of a weight value proportional to the number of imaging operations.

5. The imaging device according to claim 2,
wherein the setting menu change section changes an order of the display setting items to be displayed as the setting menu, in accordance with the lens type and the number of mounting operations.

6. The imaging device according to claim 2,
wherein the setting menu change section changes the number of the display setting items to be displayed as the setting menu, in accordance with the lens type and the number of mounting operations.

7. The imaging device according to claim 2,
wherein the setting menu change section changes the display setting items to be displayed as the setting menu, in accordance with the lens type and the number of imaging operations.

8. The imaging device according to claim 7,
wherein the setting menu change section uses the number of imaging operations weighted on the basis of a weight value proportional to the number of mounting operations.

9. The imaging device according to claim 2,
wherein the setting menu change section changes an order of the display setting items to be displayed as the setting menu, in accordance with the lens type and the number of imaging operations.

10. The imaging device according to claim 2,
wherein the setting menu change section changes the number of the display setting items to be displayed as the setting menu, in accordance with the lens type and the number of imaging operations.

11. The imaging device according to claim 1,
wherein the controller counts an accumulated mounting time when the interchangeable lens is mounted on the lens mounting section for each lens type of the interchangeable lens detected by the lens type detection section, and stores the result in the storage section, and
wherein the setting menu change section changes the setting menu in accordance with the accumulated mounting time in addition to the number of mounting operations and the number of imaging operations.

12. The imaging device according to claim 11,
wherein the setting menu change section changes display setting items to be displayed as the setting menu, in accordance with the lens type and the accumulated mounting time.

13. The imaging device according to claim 12,
wherein the setting menu change section uses the accumulated mounting time weighted using a weight value proportional to any one of the number of mounting operations or the number of imaging operations.

14. The imaging device according to claim 11,
wherein the setting menu change section changes an order of display setting items to be displayed as the setting menu, in accordance with the lens type and the accumulated mounting time.

15. The imaging device according to claim 11,
wherein the setting menu change section changes the number of display setting items to be displayed as the setting menu, in accordance with the lens type and the accumulated mounting time.

16. The imaging device according to claim 11,
wherein in a case where the lens type detected by the lens type detection section is a specific lens type and at least one of the number of mounting operations, the accumulated mounting time, or the number of imaging operations corresponding to the specific lens type is equal to or greater than a setting value, the setting menu change section changes the setting menu.

17. The imaging device according to claim 11,
wherein in a case where the lens type detected by the lens type detection section is a specific lens type and a total sum of at least one of the numbers of mounting operations, the accumulated mounting times, or the numbers of imaging operations corresponding to a plurality of types of the interchangeable lenses that are the specific lens types is equal to or greater than a setting value, the setting menu change section changes the setting menu.

18. The imaging device according to claim 17,
wherein in a case where total sums of any two or more of the numbers of mounting operations, the accumulated mounting times, or the numbers of imaging operations corresponding to the plurality of types of interchangeable lenses that are the specific lens types are equal to or greater than the setting values, the setting menu change section resets the setting menu to an initial value, and
wherein in a case where the setting menu is reset to the initial value by the setting menu change section, the controller resets the number of counting operations stored in the storage section to an initial value.

19. The imaging device according to claim 18, further comprising:
a history storage section different from the storage section provided in the device main body or the interchangeable lens,
wherein in a case where the setting menu is reset to the initial value by the setting menu change section, the controller resets the number of counting operations stored in the storage section to the initial value, and stores the number of mounting operations, the accumulated mounting time, and the number of imaging operations of the imaging section before resetting stored for each lens type in the history storage section.

20. The imaging device according to claim 1, further comprising:
a position information acquisition section that acquires position information; and
a time point acquisition section that acquires a mounting time point when the interchangeable lens is mounted on the lens mounting section, a mounting release time point when the interchangeable lens is detached from the lens mounting section, and an imaging time point of the imaging section,
wherein the controller stores the position information acquired by the position information acquisition section at the mounting time point, the mounting release time point, and the imaging time point in the storage section, in association with the mounting time point, the mounting release time point, and the imaging time point, for each lens type of the interchangeable lens.

21. The imaging device according to claim 20,
wherein in a case where the lens type detected by the lens type detection section is a specific lens type and at least one of current position information acquired by the position information acquisition section or a current time point matches position information and an imaging time point stored in the storage section, the controller reads out the mounting time point and the mounting release time point in association with the position information and the imaging time point in correspondence with the specific lens type, and calculates an accumulated mounting time when the interchangeable lens is mounted on the lens mounting section, and
wherein in a case where at least one of the number of mounting operations, the accumulated mounting time, or the number of imaging operations is equal to or greater than a setting value, the setting menu change section changes the setting menu.

22. The imaging device according to claim 21,
wherein in a case where at least two of the number of mounting operations, the accumulated mounting time, or the number of imaging operations are equal to or greater than the setting values, the setting menu change section resets the setting menu to an initial value, and
wherein in a case where the setting menu is reset to the initial value by the setting menu change section, the controller resets the number of counting operations stored in the storage section to an initial value.

23. The imaging device according to claim 22, further comprising:
a history storage section different from the storage section provided in the device main body or the interchangeable lens,
wherein in a case where the setting menu is reset to the initial value by the setting menu change section, the controller resets the number of counting operations stored in the storage section to the initial value, and stores the number of mounting operations, the accumulated mounting time, and the number of imaging operations before resetting stored for each lens type in the history storage section.

24. The imaging device according to claim 23,
wherein in a case where all of the number of mounting operations, the accumulated mounting time, and the number of imaging operations in a case where at least one of the current position information acquired by the position information acquisition section or the current time point matches the position information and the imaging time point stored in the storage section are smaller than the setting values, in correspondence with a plurality of types of the interchangeable lenses of which the lens type detected by the lens type detection section is a specific lens type, the setting menu change section changes the setting menu in accordance with the number of mounting operations, the accumulated mounting time, and the number of imaging operations before resetting stored in the history storage section.

25. The imaging device according to claim 21, wherein the setting menu change section sets a zoom lens in which a focus of an imaging optical system is variable by movement of a variable magnification lens as the specific lens type.

26. The imaging device according to claim 25, wherein in a case where the lens type detected by the lens type detection section is the zoom lens and at least one of the number of mounting operations, the accumulated mounting time, or the number of imaging operations corresponding to the zoom lens is equal to or greater than a setting value, the setting menu change section sets the number of display setting items to be displayed as the setting menu to be smaller than an initial value.

27. The imaging device according to claim 26, wherein in a case where the number of the display setting items to be displayed as the setting menu is set to be smaller than the initial value, the setting menu change section deletes at least one display setting item among a focus setting item, a flash setting item, and a motion picture setting item.

28. The imaging device according to claim 21, wherein the setting menu change section sets a fixed focus lens in which a focus of an imaging optical system is fixed as the specific lens type.

29. The imaging device according to claim 28, wherein in a case where the lens type detected by the lens type detection section is the fixed focus lens and a total sum of the numbers of imaging operations corresponding to a plurality of types of the interchangeable lenses that are the fixed focus lenses is equal to or greater than a predetermined number, the setting menu change section sets the number of display setting items to be displayed as the setting menu to be larger than an initial value.

30. The imaging device according to claim 21, wherein the setting menu change section sets a wide angle lens as the specific lens type.

31. The imaging device according to claim 30, wherein in a case where the lens type detected by the lens type detection section is the wide angle lens and a total sum of at least one of the numbers of mounting operations, the accumulated mounting times, or the numbers of imaging operations corresponding to a plurality of types of the interchangeable lenses that are the wide angle lenses is equal to or greater than a setting value, the setting menu change section displays display setting items suitable for scenery imaging as the setting menu.

32. The imaging device according to claim 21, wherein the setting menu change section sets a large diameter lens as the specific lens type.

33. The imaging device according to claim 32, wherein in a case where the lens type detected by the lens type detection section is the large diameter lens and a total sum of at least one of the numbers of mounting operations, the accumulated mounting times, or the numbers of imaging operations corresponding to a plurality of types of the interchangeable lenses that are the large diameter lenses is equal to or larger than a setting value, the setting menu change section displays display setting items suitable for night scene imaging or portrait imaging as the setting menu.

34. The imaging device according to claim 20, wherein in a case where at least one of current position information acquired by the position information acquisition section or a current time point matches position information and an imaging time point stored in the storage section, in correspondence with a plurality of types of the interchangeable lenses of which the lens type detected by the lens type detection section is a specific lens type, the controller reads out the mounting time point and the mounting release time point associated with the position information and the imaging time point, and calculates an accumulated mounting time when each interchangeable lens is mounted on the lens mounting section, and
wherein in a case where at least one of the number of mounting operations, the accumulated mounting time, or the number of imaging operations is equal to or greater than a setting value, the setting menu change section changes the setting menu.

35. An interchangeable lens which is mounted on the lens mounting section of the imaging device according to claim 1 and is provided with the storage section.

36. An imaging device control method comprising:
a step of detecting a lens type of an interchangeable lens mounted on a lens mounting section on which a plurality of types of the interchangeable lenses are selectively mounted;
a step of counting the number of mounting operations of the interchangeable lens on the lens mounting section and the number of imaging operations performed in a state where the interchangeable lens is mounted on the lens mounting section, for each lens type of the interchangeable lens;
a step of storing the number of mounting operations and the number of imaging operations;
a step of displaying a setting menu for setting an imaging function; and
a step of changing, in a case where the interchangeable lens is mounted on the lens mounting section, the setting menu in accordance with the lens type, and the number of mounting operations and the number of imaging operations corresponding to the lens type.

* * * * *